(12) United States Patent
Smith et al.

(10) Patent No.: US 11,562,739 B2
(45) Date of Patent: Jan. 24, 2023

(54) CONTENT OUTPUT MANAGEMENT BASED ON SPEECH QUALITY

(71) Applicant: Amazon Technologies, Inc., Seattle, WA (US)

(72) Inventors: Andrew Smith, Seattle, WA (US); Christopher Schindler, Bainbridge Island, WA (US); Karthik Ramakrishnan, Bellevue, WA (US); Rohit Prasad, Lexington, MA (US); Michael George, Seattle, WA (US); Rafal Kuklinski, Otomin (PL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/786,629

(22) Filed: Feb. 10, 2020

(65) Prior Publication Data

US 2020/0251104 A1 Aug. 6, 2020

Related U.S. Application Data

(63) Continuation of application No. 15/933,676, filed on Mar. 23, 2018, now Pat. No. 10,600,408.

(51) Int. Cl.
*G10L 15/20* (2006.01)
*G10L 13/033* (2013.01)
*G10L 13/10* (2013.01)
*G10L 15/18* (2013.01)

(52) U.S. Cl.
CPC ............ *G10L 15/20* (2013.01); *G10L 13/033* (2013.01); *G10L 13/10* (2013.01); *G10L 15/1807* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,831,550 A | * | 5/1989 | Katz | ............... G10L 15/14 704/240 |
| 6,725,194 B1 | * | 4/2004 | Bartosik | ............... G10L 15/075 704/235 |
| 8,275,621 B2 | * | 9/2012 | Alewine | ............... G10L 13/08 704/266 |

(Continued)

FOREIGN PATENT DOCUMENTS

| | | | | |
|---|---|---|---|---|
| JP | 2016-002879 | * | 1/2016 | ........... G10L 13/027 |
| WO | WO-2016002879 A1 | * | 1/2016 | ........... G10L 13/027 |

*Primary Examiner* — Mohammad K Islam
(74) *Attorney, Agent, or Firm* — Pierce Atwood LLP

(57) ABSTRACT

Techniques for ensuring content output to a user conforms to a quality of the user's speech, even when a speechlet or skill ignores the speech's quality, are described. When a system receives speech, the system determines an indicator of the speech's quality (e.g., whispered, shouted, fast, slow, etc.) and persists the indicator in memory. When the system receives output content from a speechlet or skill, the system checks whether the output content is in conformity with the speech quality indicator. If the content conforms to the speech quality indicator, the system may cause the content to be output to the user without further manipulation. But, if the content does not conform to the speech quality indicator, the system may manipulate the content to render it in conformity with the speech quality indicator and output the manipulated content to the user.

22 Claims, 14 Drawing Sheets

(56) References Cited

U.S. PATENT DOCUMENTS

| | | | |
|---|---|---|---|
| 8,965,769 B2* | 2/2015 | Mori | G06F 40/117 704/260 |
| 9,047,868 B1* | 6/2015 | O'Neill | G10L 15/197 |
| 9,966,066 B1* | 5/2018 | Corfield | G10L 15/142 |
| 10,127,908 B1* | 11/2018 | Deller | G06F 40/295 |
| 10,140,973 B1* | 11/2018 | Dalmia | G10L 15/26 |
| 10,192,552 B2* | 1/2019 | Raitio | G10L 25/18 |
| 10,217,452 B2* | 2/2019 | Kayama | G10L 25/90 |
| 10,276,149 B1* | 4/2019 | Liang | G10L 13/033 |
| 10,319,250 B2* | 6/2019 | Lokeswarappa | G09B 5/04 |
| 10,319,365 B1* | 6/2019 | Nicolis | G10L 15/26 |
| 10,339,925 B1* | 7/2019 | Rastrow | H04L 67/306 |
| 10,388,272 B1* | 8/2019 | Thomson | G10L 15/22 |
| 10,448,115 B1* | 10/2019 | Jamal | G10L 15/1815 |
| 10,468,027 B1* | 11/2019 | Deller | G10L 15/26 |
| 2005/0273337 A1* | 12/2005 | Erell | G10L 15/07 704/260 |
| 2006/0085183 A1* | 4/2006 | Jain | G10L 17/26 704/E15.044 |
| 2007/0162272 A1* | 7/2007 | Koshinaka | G06F 16/35 707/E17.089 |
| 2011/0282643 A1* | 11/2011 | Chatterjee | G06F 40/44 704/2 |
| 2011/0288861 A1* | 11/2011 | Kurzweil | G09B 5/062 704/E15.044 |
| 2012/0117153 A1* | 5/2012 | Gunasekar | G06Q 10/10 709/204 |
| 2015/0243181 A1* | 8/2015 | Somasundaran | G09B 7/02 434/167 |
| 2016/0093287 A1* | 3/2016 | Bangalore | G10L 15/197 704/260 |
| 2016/0379638 A1* | 12/2016 | Basye | G10L 15/22 704/235 |
| 2017/0011344 A1* | 1/2017 | Choi | G06Q 10/103 |
| 2017/0116978 A1* | 4/2017 | Matsubara | G10L 15/1815 |
| 2017/0221470 A1* | 8/2017 | Kayama | G10L 13/0335 |
| 2017/0358301 A1* | 12/2017 | Raitio | G10L 25/18 |
| 2018/0053502 A1* | 2/2018 | Biadsy | G10L 15/18 |
| 2018/0082679 A1* | 3/2018 | McCord | G06N 3/08 |
| 2018/0122361 A1* | 5/2018 | Silveira Ocampo | G10L 15/02 |
| 2018/0294001 A1* | 10/2018 | Kayama | G10L 15/02 |
| 2019/0251964 A1* | 8/2019 | Dharne | G10L 15/183 |
| 2019/0325866 A1* | 10/2019 | Bromand | G06F 3/167 |
| 2019/0341026 A1* | 11/2019 | Visser | G10L 25/63 |
| 2020/0243062 A1* | 7/2020 | Scodary | G10L 15/26 |

* cited by examiner

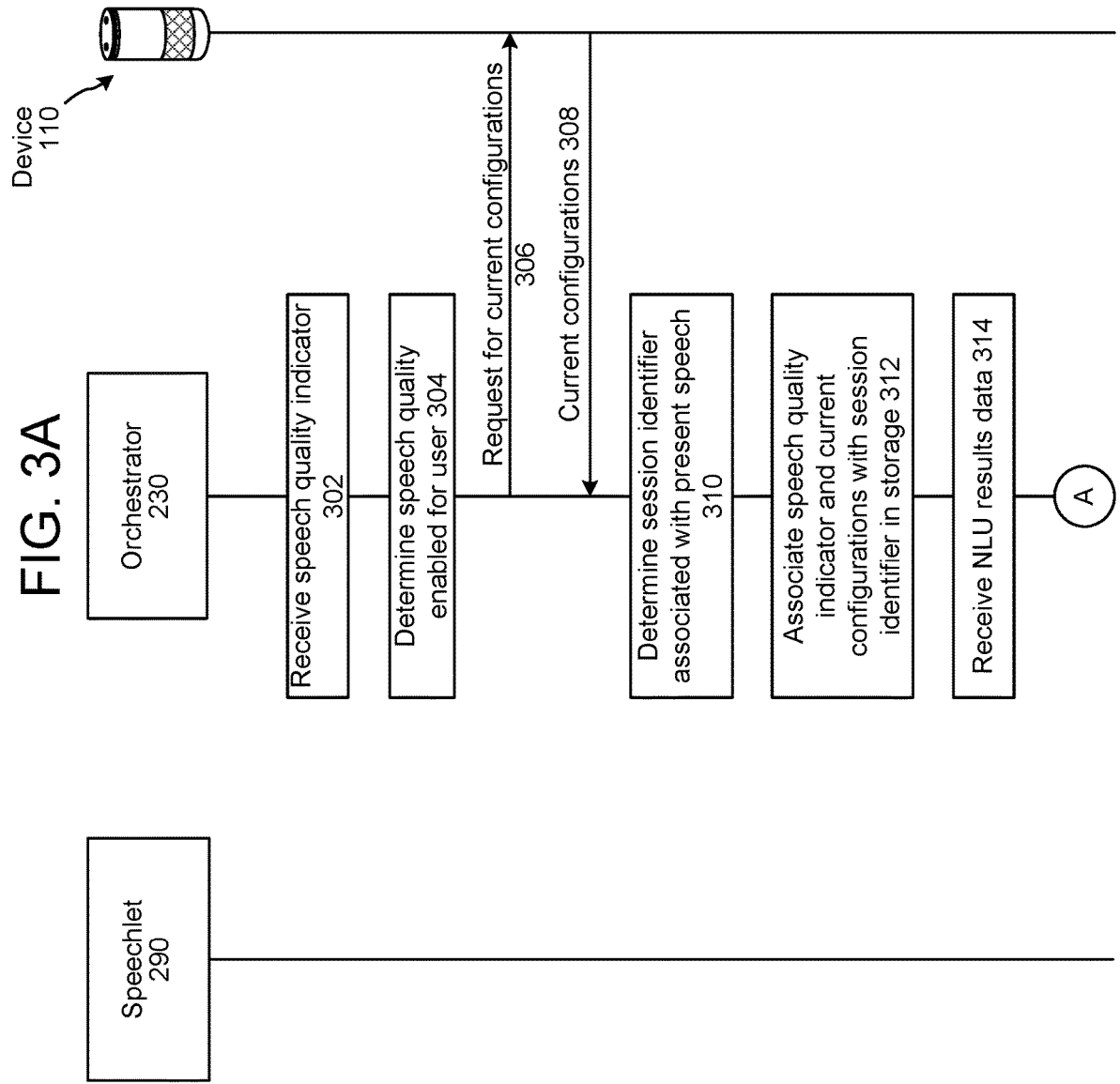

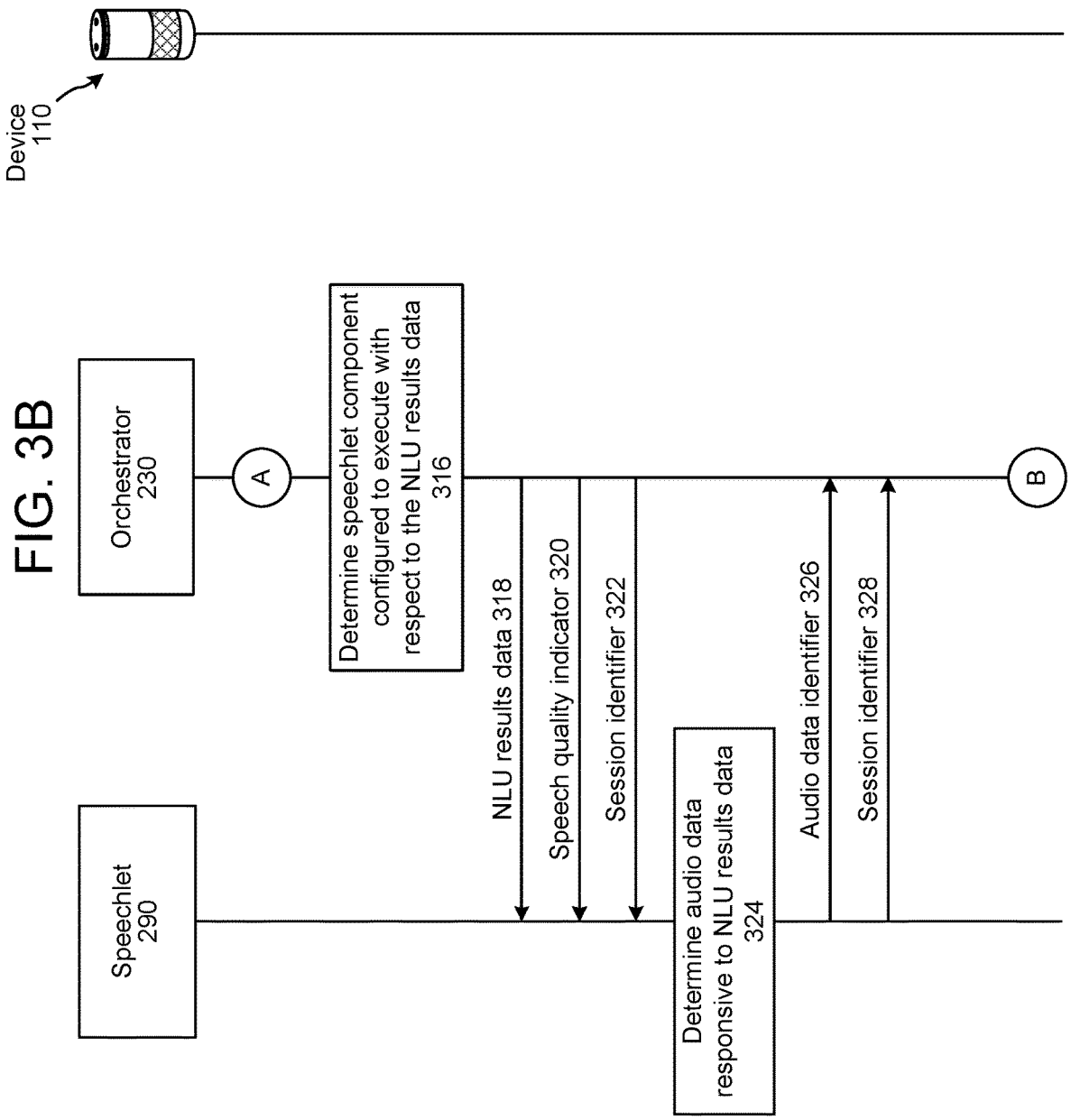

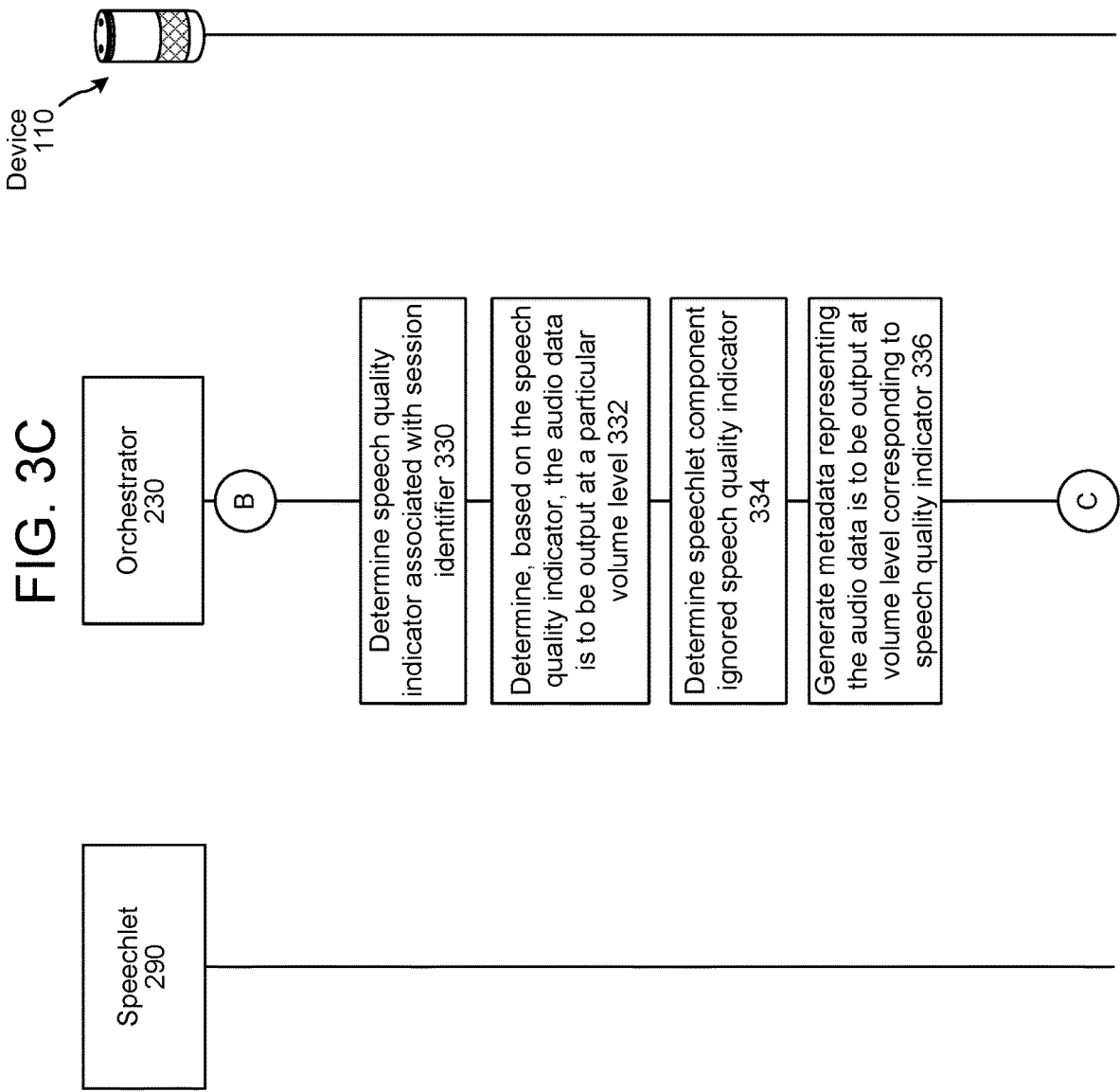

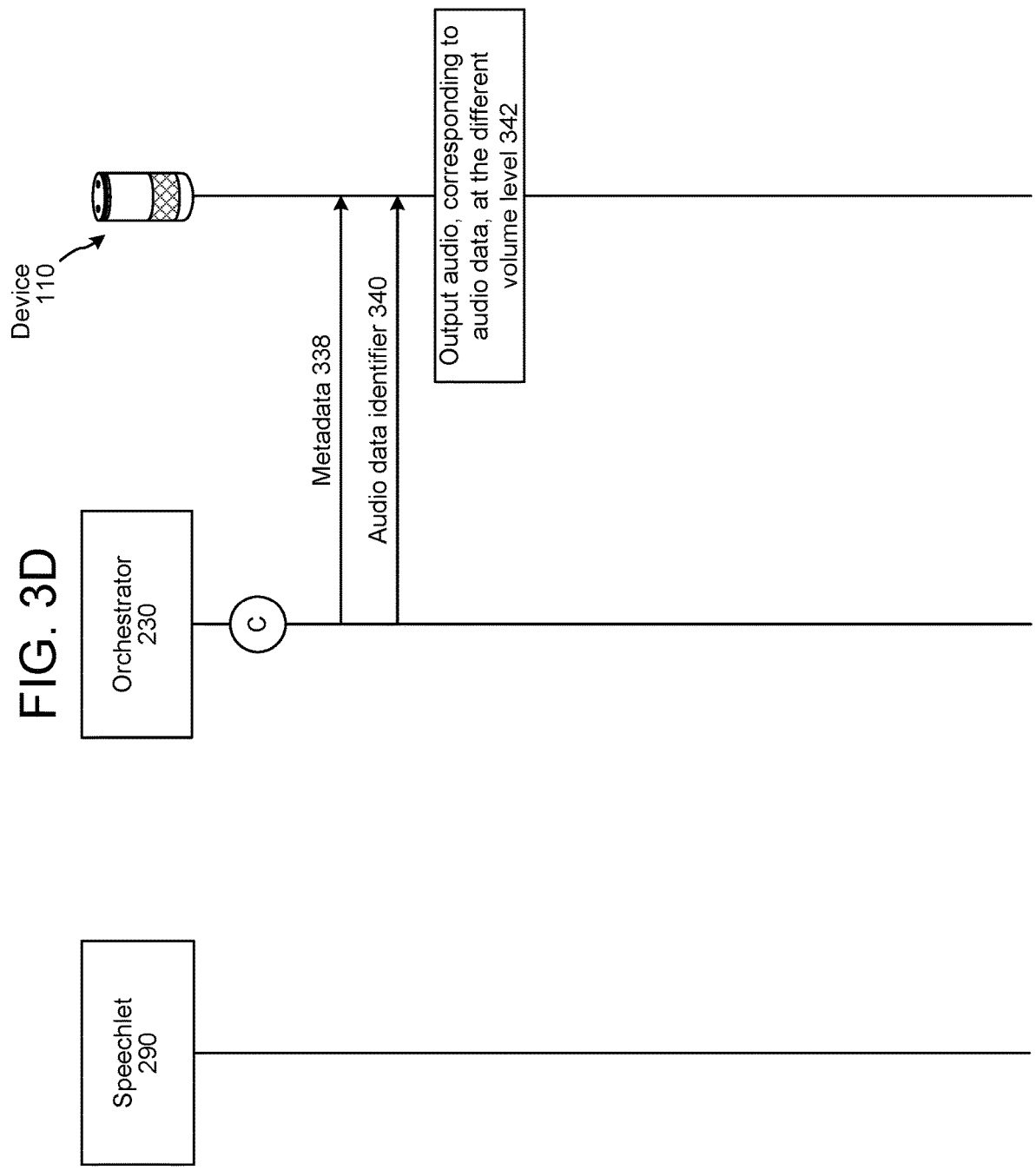

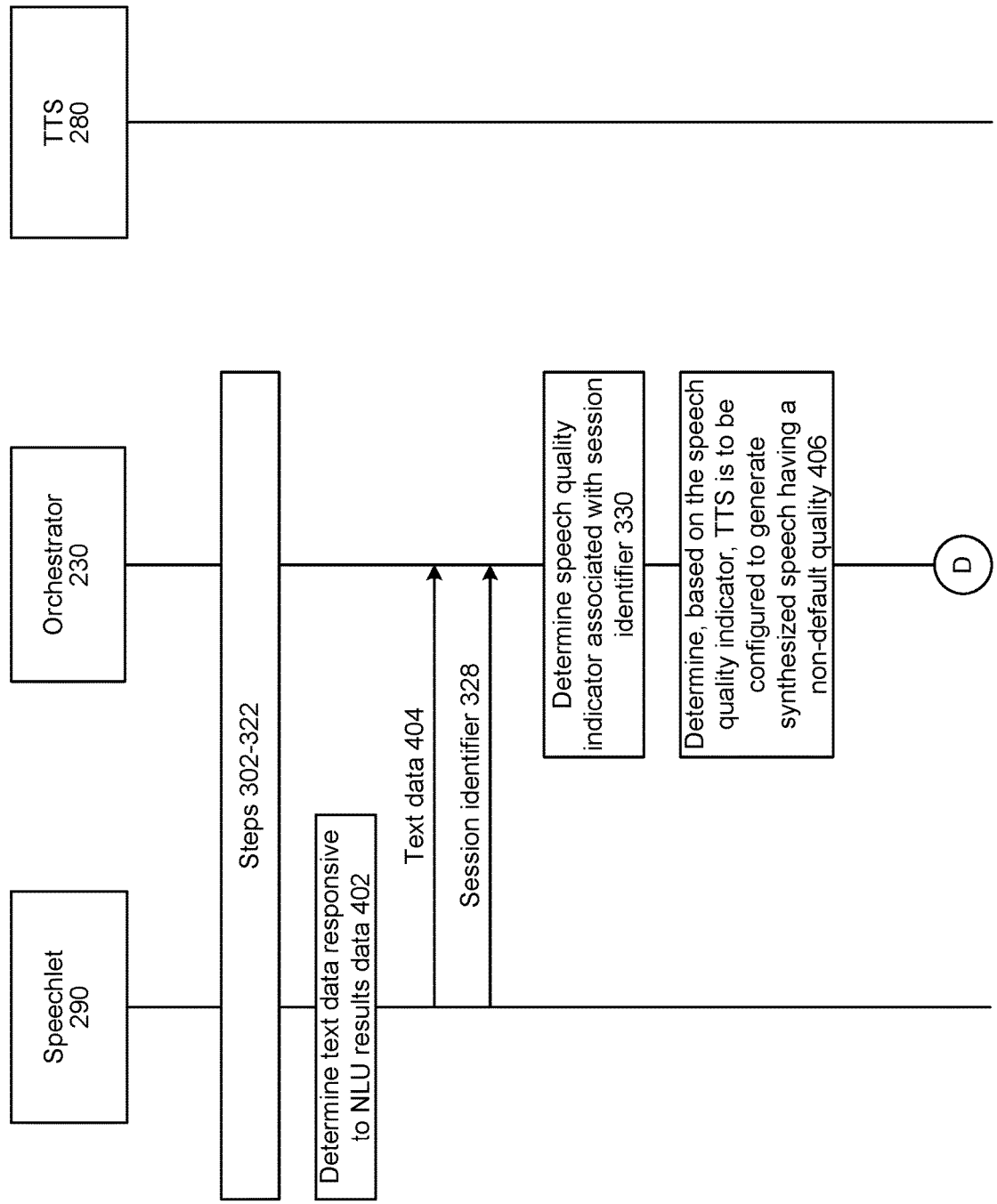

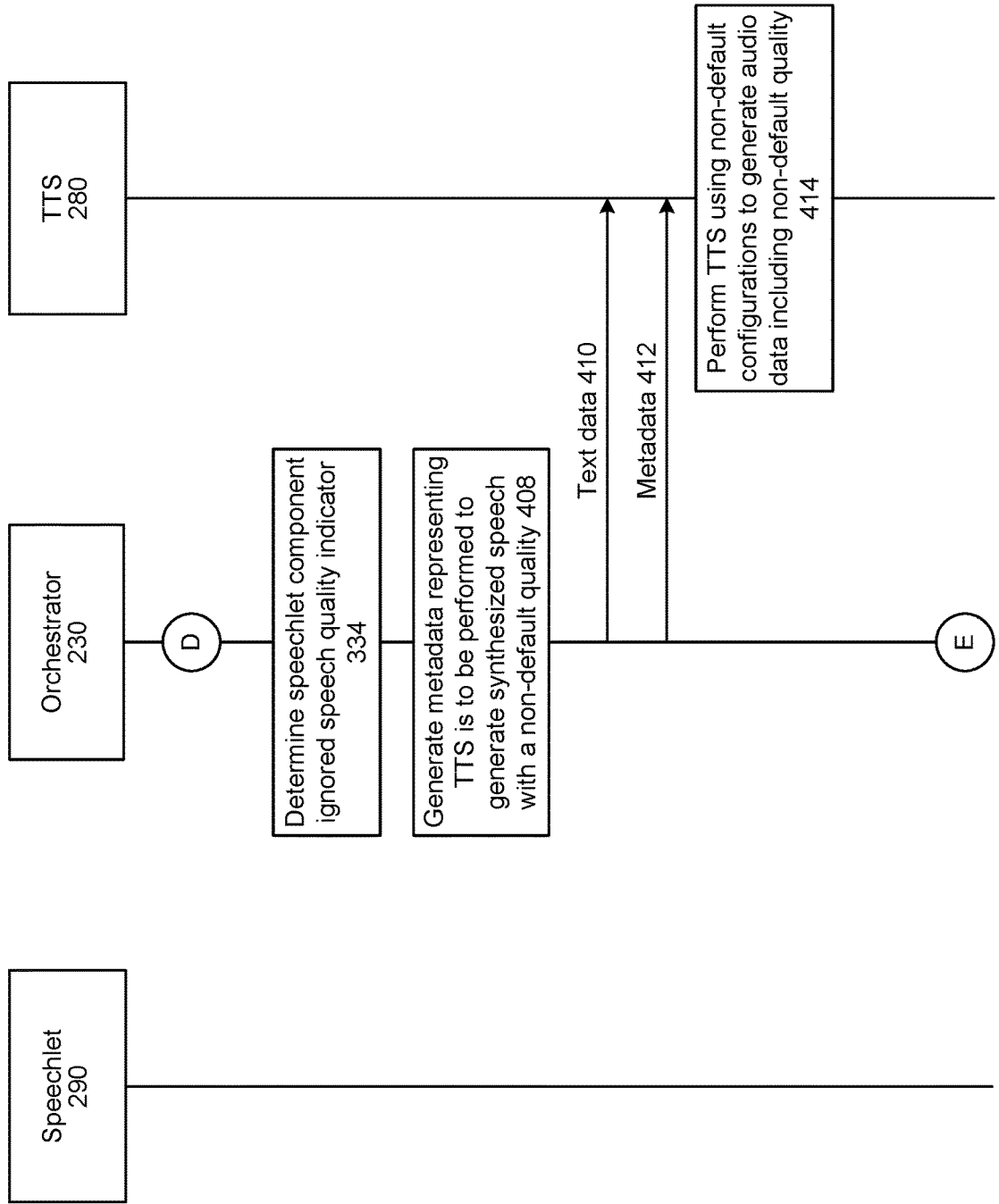

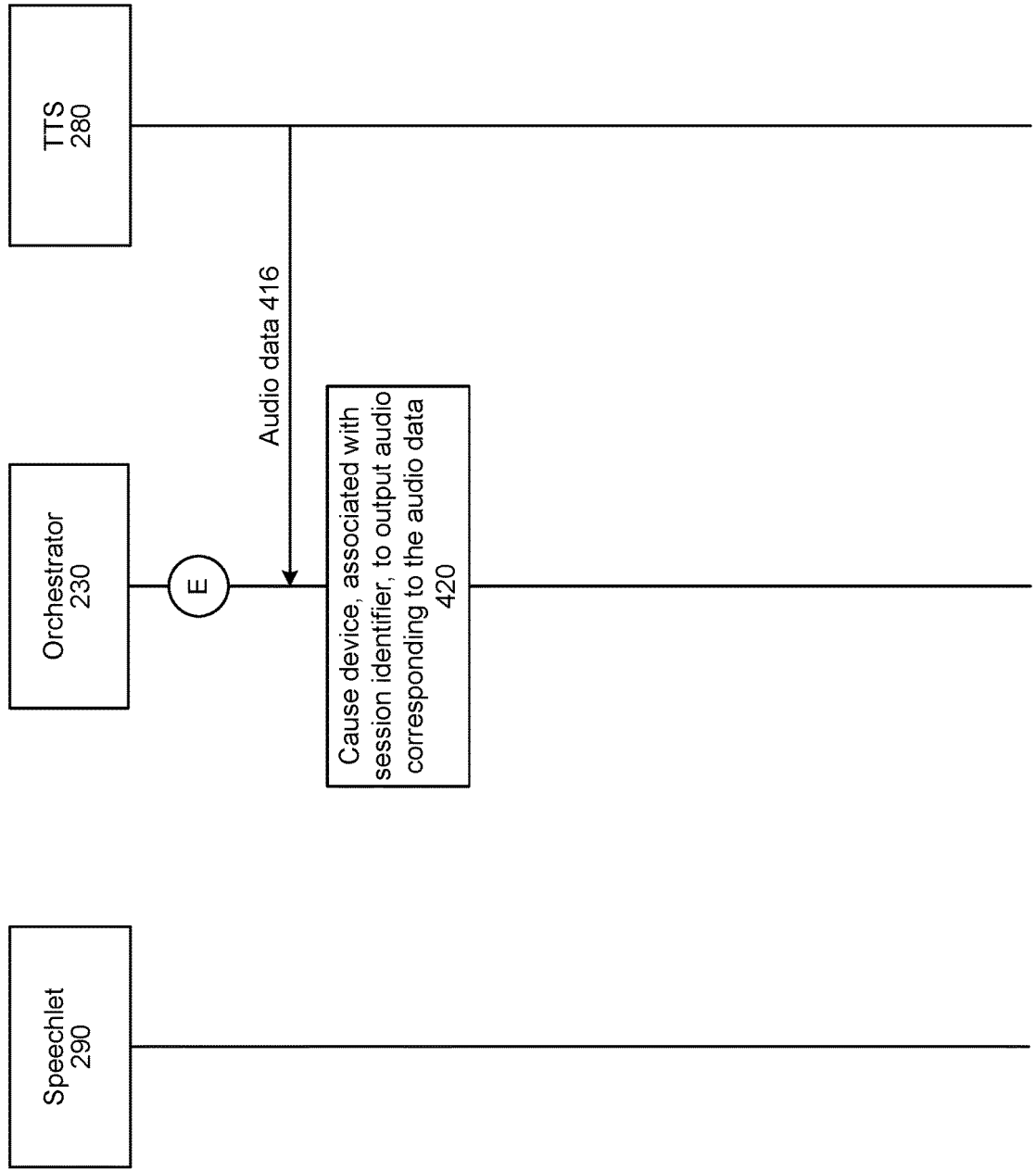

CONTENT OUTPUT MANAGEMENT BASED ON SPEECH QUALITY

CROSS-REFERENCE TO RELATED APPLICATION

This application claims priority to, and is a continuation of, U.S. patent application Ser. No. 15/933,676, titled "Content Output Management Based on Speech Quality," filed on Mar. 23, 2018, which is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A through 3D are a signal flow diagram illustrating how a system may cause a speechlet component output to be output to a user according to a speech quality indicator according to embodiments of the present disclosure.

FIGS. 4A through 4C are a signal flow diagram illustrating how a system may cause a speechlet component output to be output to a user according to a speech quality indicator according to embodiments of the present disclosure.

DETAILED DESCRIPTION

Figure 1:
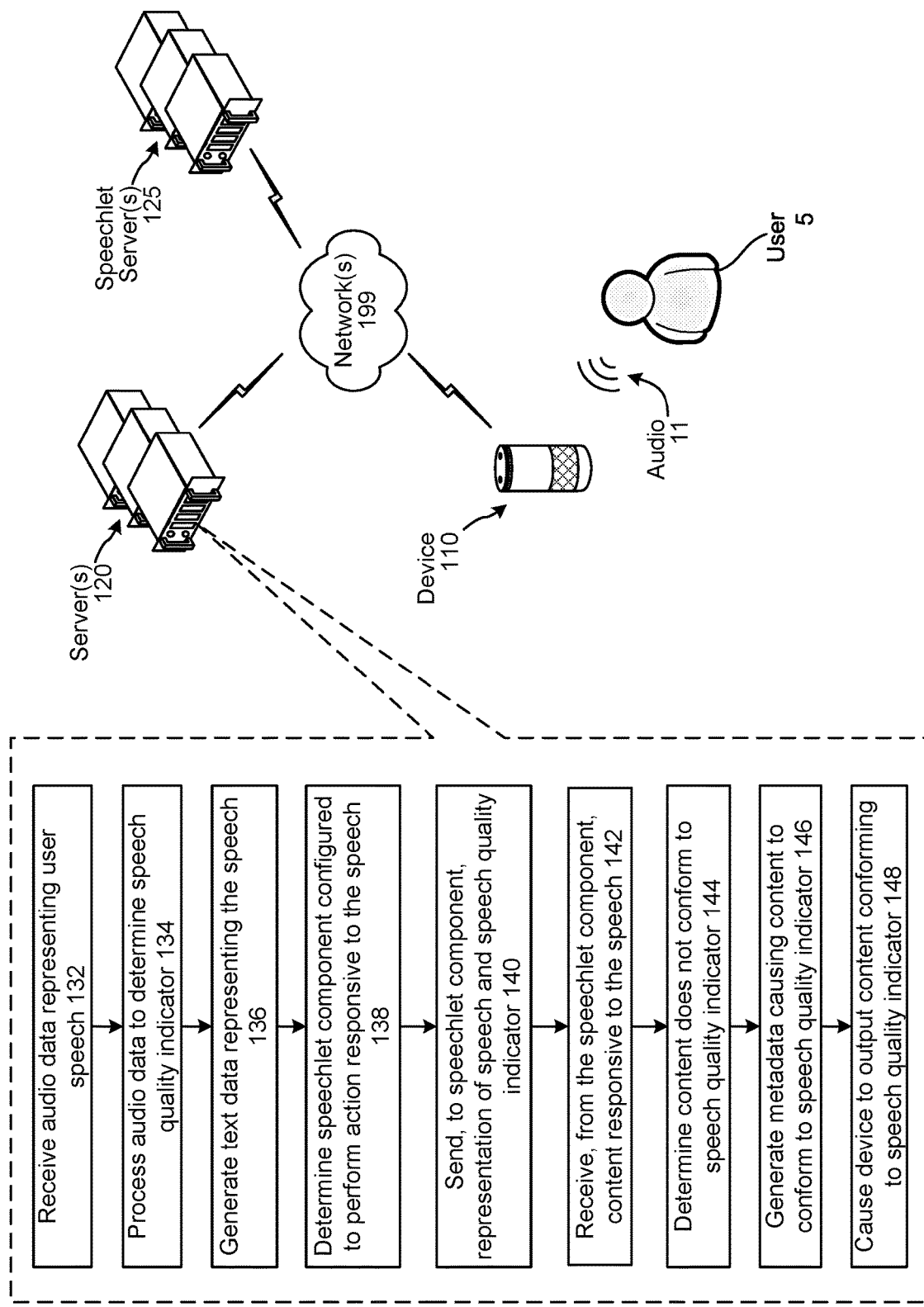
FIG. 1 illustrates a system configured to output content based on a quality of user speech according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

A system may be configured to receive user speech, process the speech to determine a requested action (e.g., operation to be performed or content to be output), and perform the action. For example, a user may say "Alexa, what is the weather" and, in response, the system may determine weather information for the user's location and output the weather information as synthesized speech to the user. For further example, a user may say "Alexa, play Adele" and, in response, the system may output music by Adele to the user. For yet further example, a user may say "Alexa, book me a ride to the Seattle airport" and, in response, the system may (i) interact with a ride sharing service's system to book the ride and (ii) output synthesized speech to the user confirming the booking.

A user may speak to an endpoint (e.g., local device) of a system in different manners. For example, a user may speak to the endpoint in normal tone and tempo, may whisper to the endpoint, may shout to the endpoint, may say something rapidly to the endpoint, and the like.

The user may desire the system configure its output based on how the user speaks to the endpoint. For example, if a user whispers to an endpoint, the user may desire whispered synthesized speech be output in response. For further example, if a user whispers to an endpoint, the user may desire responsive music to be output at a lower volume than if the user spoke at a normal volume to the endpoint.

The system may need to call a speechlet to provide content responsive to a user's speech. The system may send an indicator of the user's speech quality to the speechlet so the speechlet can determine content based on the speech quality. An indicator may represent, for example, speech was whispered, speech was shouted, etc. As an example, if the indicator represents speech was whispered, a speechlet may provide content having a whispered quality.

In some instances, a speechlet may ignore the indicator. For example, a speechlet may receive an indicator representing speech was whispered but the speechlet may output content having a normal speech quality.

The present disclosure provides techniques for ensuring content output to a user conforms to a quality of the speech of the user, even when a speechlet ignores the speech's quality. The teachings of the present disclosure result in a user-system experience that is configured to seem like a human-human experience.

When the system receives speech, the system may create an indicator of (e.g., data representing) the speech's quality (e.g., whispered, shouted, fast, slow, etc.), the indicator stored in memory. When the system receives output content from a speechlet (e.g., skill), the system checks whether the output content is in conformity with the speech quality indicator. If the content conforms to the speech quality indicator, the system may cause the content to be output to the user without further manipulation. But, if the content does not conform to the speech quality indicator, the system may manipulate the content to render it in conformity with the speech quality indicator and output the manipulated content to the user. For example, if a user whispers a question and a speechlet (i) provides text corresponding to an answer but (ii) fails to indicate the text should be output as whispered synthesized speech, the system may nonetheless instruct TTS processing to generate whispered synthesized speech.

The output of the system may be an in-kind response. For example, if a user whispers to the system, the system may respond with synthesized speech having a whisper quality. The output of the system may not be an in-kind response. For example, if a user shouts to the system, the system may respond with synthesized speech having a whisper quality. A system according to the present disclosure is thus configured to provide an intelligent response corresponding to how a human would respond to the user, which may or may not be in-kind.

FIG. 1 illustrates a system configured to output content based on a quality of user speech. Although the figures and discussion of the present disclosure illustrate certain operational steps of the system in a particular order, the steps described may be performed in a different order (as well as certain steps removed or added) without departing from the intent of the disclosure. A device 110 local to a user 5, one or more servers 120, and one or more speechlet servers 125 may communicate across one or more networks 199.

The user 5 may speak an input to the device 110. The device 110 captures audio 11 corresponding to the speech and generates audio data corresponding to the audio 11. The device 110a sends the audio data to the server(s) 120 for processing. In some instances, the device 110a may send the audio data to the server(s) 120 using a companion application that operates on the device 110 and is in communication with the server(s) 120.

The server(s) 120 receives (132) audio data representing the user's speech. The server(s) 120 processes (134) the audio data to determine a speech quality indicator representing a quality of the speech. The speech quality indicator may represent the speech was whispered, shouted, spoken fast, or the like. The server(s) 120 also generates (136) text data representing the speech in the audio data. For example, the server(s) 120 may perform ASR processing on the audio data to generate the text data.

The server(s) 120 determines (138) a speechlet component configured to perform an action (e.g., perform an operation or provide content) responsive to the speech. For example, the server(s) 120 may perform NLU processing on the text data to determine an intent of the user as represented in the speech. The server(s) 120 may use results of NLU processing to determine the speechlet component configured to most aptly perform the action.

Unless expressly stated otherwise, reference to a speechlet, speechlet device, or speechlet component may include a speechlet component operating within the server(s) 120 and/or a speechlet component operating within a speechlet server(s) 125.

The server(s) 120 sends (140) a representation of the speech and the speech quality indicator to the speechlet component. The representation of the speech may be a portion of the NLU results associated with the speechlet component. For example, the representation may include an indication of the user's intent as well as portions of text (e.g., slots), corresponding to portions of the user input, that may be used by the speechlet component to perform an action responsive to the user input.

The speechlet component processes with respect to at least the representation of the speech to either perform the action responsive to the speech. If the speechlet component performs an operation, the speechlet component may also generate data representing the operation was performed. The speechlet component may output content in the form of text data or audio data. The server(s) 120 receives (142) the content from the speechlet component.

The server(s) 120 determines whether the content conforms to the speech quality indicator that was generated for the speech and sent to the speechlet component. For example, if the speech quality indicator represents the speech was whispered, the server(s) 120 may determine whether audio data received from the speechlet component is accompanied by a directive to output the audio data at a decreased volume. For further example, if the speech quality indicator represents the speech was whispered, the server(s) 120 may determine whether text data received from the speechlet component is accompanied by a directed to perform text-to-speech processing on the text data to generate whispered synthesized speech.

If the server(s) 120 determines the content conforms to the speech quality indicator, the server(s) 120 may cause the content to be output to the user 5 or cause TTS processing to be performed on the content, as received from the speechlet component without manipulation by the server(s) 120. If the server(s) 120 determines (144) the content does not conform to the speech quality indicator, the server(s) 120 updates (146) generates metadata that causes the content to conform to the speech quality indicator. For example, the received content may be audio data that is either accompanied by a directed to output the audio data at a normal volume level or that is not accompanied by a volume level directive. If the speech quality indicator represents the speech was whispered, the server(s) 120 may generate metadata representing the audio data is to be output at a less-than-normal volume level. For further example, the received content may be text data that is either accompanied by a directive to perform "traditional" TTS processing or that is not accompanied by a TTS processing directive. If the speech quality indicator represents the speech was whispered, the server(s) 120 may generate metadata representing TTS processing of the text data is to result in whispered synthesized speech.

The server(s) 120 (148) causes the device 110 to output content conforming to the speech quality indicator. According to the above examples, the server(s) 120 may cause the device 110 to output whispered synthesized speech or the server(s) 120 may send the audio data and associated metadata to the device 110, resulting in the device 110 outputting audio, corresponding to the audio data, at a less-then-normal volume. In an example, the less-than-normal volume is a volume matching or substantially matching the whispered speech's volume.

Figure 2:
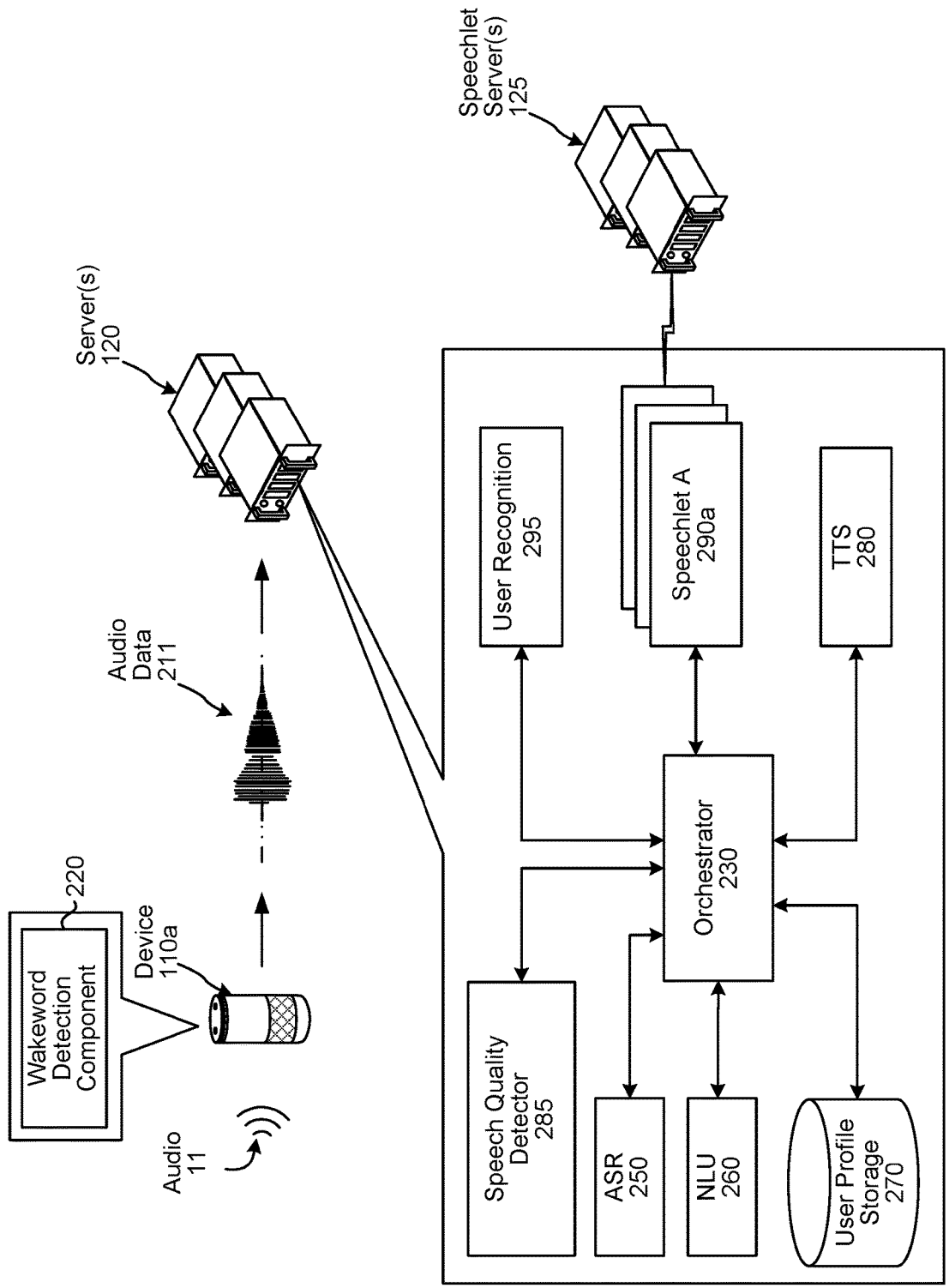
FIG. 2 is a conceptual diagram for processing user input according to embodiments of the present disclosure.

FIG. 2 is a conceptual diagram of how user inputs may be processed. The various components illustrated in FIG. 2 may be located on a same or different physical devices. Communication between various components illustrated in FIG. 2 may occur directly or across one or more networks 199.

An audio capture component(s), such as a microphone or array of microphones of the device 110, may be configured to continuously capture audio while in a "sleep" mode. While in the sleep mode, the device 110 may process audio data, representing captured audio, to determine whether speech is present in the audio data.

The device 110 may use various techniques to determine whether audio data includes speech. For example, the device 110 may apply voice activity detection (VAD) techniques, which may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing audio, the device 110 may use a wakeword detection component 220 to determine when a user intends to speak an input to the device 110. This process may also be referred to as wakeword detection or keyword detection, with a wakeword being a specific example of a keyword. Keyword detection is typically performed without performing linguistic analysis, textual analysis, or semantic analysis. Instead, audio data, already determined to include speech, is analyzed to determine if specific characteristics of the audio data match preconfigured acoustic waveforms, audio signatures, or other data to determine if the audio data matches (i.e., is similar to by at least a threshold value) stored audio data corresponding to a keyword.

Once the wakeword is detected, the device 110 may "wake" and begin transmitting audio data 211, representing the audio 11 including user speech spoken following or otherwise surrounding the wakeword, to the server(s) 120. The audio data 211 may include data corresponding to the wakeword, or the portion of the audio data 211 corresponding to the wakeword may be removed by the device 110a prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. If the text data output from the ASR component 250 includes an N-best list, the N-best list may include a respective score associated with each hypothesis represented therein. Each score may indicate a confidence of ASR processing performed to generate the hypothesis with which the score is associated.

The server(s) 120 may be configured with a speech quality detector 285. Some systems may implement the speech quality detector 285 as part of the ASR component 250.

The speech quality detector 285 may be capable of determining various qualities of the speech represented in the audio data 211. Such qualities include, for example, whether the speech was whispered, whether the speech was spoken in an excited voice, whether the speech was spoken in a sad voice, whether the speech was whined, whether the speech was shouted, etc. The speech quality detector 285 may output a speech quality indicator 285 representing the one or more speech qualities of the speech in the audio data 211. Each speech quality in the speech quality indicator may be associated with a confidence value. Each confidence value may be a binned value (e.g., high, medium, low) or numeric value (e.g., a value from 0 to 1, or some other scale). Each speech quality in the speech quality indicator may alternatively be represented as a binary value (e.g., yes or no) indicating whether the speech exhibited that particular speech quality. The speech quality indicator may include values if the speech quality detector 285 assumes the audio data is comprised of high-quality signals. If such an assumption is not made, signal quality may be one factor in determine a confidence value for a particular speech quality.

The speech quality detector 285 may process based on paralinguistic metrics that describe some quality/feature other than the specific words spoken. Paralinguistic features may include acoustic features such as speech tone/pitch; rate of change of pitch (e.g., first derivative of pitch); speed; prosody/intonation; resonance; energy/volume; hesitation; phrasing; nasality; breath; whether the speech includes a cough, sneeze, laugh, or other non-speech articulation; detected background audio/noises; distance between the user and a device 110; etc.

For example, the speech quality detector 285 may determine speech was whispered based on audio (and possibly non-audio) paralinguistic feature data. Whispered speech is typically "unvoiced," that is words are spoken using articulators (e.g., mouth, lips, tongue, etc.) as normal, but without use/vibration of vocal cords such that the speech has no resonance, or resonance below a certain threshold. Vocal resonance occurs when the product of voicing (i.e., phonation) is enhanced in tone quality (i.e., timbre) and/or intensity by the air-filled cavities through which speech passes on the speech's way to the outside air. During whispering, air comes through the throat without being modulated by the vocal cords so that what is left is motion of the articulators resulting in a stream of air without valve structure. Whispered speech may also include speech that is at a low volume or volume below a threshold. Some combination of low to no resonance combined with low volume may constitute a whisper for purposes of the speech quality detector's processing. As noted below, a machine learning model may be trained to recognize whispered speech based on resonance, volume, and/or other features of the audio data 211.

The speech quality detector 285 may determine that speech has resonance below a threshold and/or a volume below a threshold. Thus, the speech quality detector 285 may determine that the speech has a speech quality corresponding to a whisper/approximated whisper. The speech quality detector 285 may be trained to analyze paralinguistic feature data to make a decision as to whether speech is whispered. While the speech quality detector 285 may determine whether speech is whispered based on whether a particular paralinguistic feature value(s) is below a threshold (e.g., whether speech has a resonance under a particular threshold and/or a volume under a particular threshold, etc.), more complex decision making is possible using machine learning models and training techniques. Thus, paralinguistic feature values, whether from the audio data 211 or non-audio data, may be input as features to the speech quality detector 285.

The speech quality detector 285 may perform whisper detection based on a long-short term memory (LSTM) neural network trained on log-filterbank energy (LFBE) acoustic features. The model may be trained and evaluated on recordings of human interactions with voice-controlled, far-field devices in whisper and normal phonation modes. The LSTM model learns whisper characteristics from the LFBE features, enabling use of a scalable detector without reliance on engineered features.

The input data to the whisper classifier of the speech quality detector 285 is in the form of sequential frames. Standard feed-forward multi-layer perceptron (MLP) networks, with no concept of memory, may not allow use of this data in an intuitive sequential, contextual way. Recurrent neural networks (RNNs) use feedbacks from their internal states in processing sequences of inputs, and thus consider the history of its state when modeling sequential data. However, RNNs are limited to short-term memory, as they suffer from vanishing/exploding gradient problem. Long-short term memory (LSTM) models are extensions of RNNs, where memory cells with input, output, and forget gates are introduced at each recurrent layer to control the flow of information, consequently facilitating the learning of both short and long term dependencies in the input sequences.

For the whisper classifier, LSTM models are trained using sequences of frames and their labels. Since this application of the model uses utterance-level decisions, each utterance in the training dataset may be tagged as whisper/non-whisper. These tags are propagated as target labels to all frames of that particular utterance. The model is trained using a cross-entropy objective function and is optimized with stochastic gradient descend (SGD) using the back-propagation through time (BPTT) algorithm.

To better represent the model's prediction over the course of an entire utterance, different inference modules may be used including last-frame, which takes the last frame posterior, window N, which takes the mean posterior of a window of the last N frames, and/or mean which takes the mean posterior of all frames.

The system may extract 64-dimensional LFBE features for every 25 ms frame of the utterance, with 10 ms overlap between the frames. Cepstral mean subtraction (CMS) may be applied to utterances on a per-speaker, per-device in real recordings and per-speaker in in-house test data. The LSTM model structure consists of 2 hidden layers each with 64 memory cells. The output layer is 2-dimensional, corresponding to whisper and normal status.

The whisper classification models may be structured to output scores at the frame level. Given a set of individual frame scores across a given utterance, the system may use an inference module, or result building process, to generate a classification score at the utterance level.

Different feature values may also be used including sum of residual harmonics (SRH), high-frequency energy (HFE), and features based on auto-correlation of time-domain signal (ACMAX) as explained below.

Sum of Residual Harmonics (SRH): Whisper speech is typically characterized by the absence of fundamental frequency (F0) due to a lack of voicing. The SRH feature is used as a voicing detector in this work. The SRH feature uses harmonic information in the residual signal and is calculated as:

$$SHR(f) = E(f) + \sum_{k=2}^{N_{harm}} \left[ E(k \cdot f) - E\left(\left(k - \frac{1}{2}\right) \cdot f\right) \right]$$

where E(f) is the amplitude spectrum for each Hanning-windowed frame, and for voiced speech presents peaks at the harmonics of F0. The second term in summation, E((k−½).f), helps reduce the relative importance of the maxima of SRH at even harmonics. The value of SRH is sensitive to the initial fast Fourier transform (FFT) size, and higher FFT sizes lead to better separation between the values of SRH features in whisper versus normal speech.

High Frequency Energy (HFE): The HFE feature consists of two dimensions. The first dimension reflects the energy ratio between the high frequency band (6875~8000 Hz) energy and the low frequency band (310~620 Hz) energy. Whisper generally has less energy in lower frequency bands, thus this ratio can be effective in distinguishing whisper and normal speech. The high and low frequency bands are empirically selected to maximize the separation. The second dimension is the Shannon entropy of the low frequency area. This entropy is calculated by treating the power spectrum as a probability distribution. Whisper tends to have high entropy in the low frequency band.

Auto-Correlation Peak Maximum (ACMAX): The maximum autocorrelation peak within the plausible human F0 range (80~450 Hz) is calculated and used as the first dimension for this feature. A value is identified as a peak if it is larger than its 4 neighbors on the left and right. The second and third dimensions of the ACMAX feature consist of the position of the peak and the mean distance between consecutive autocorrelation peaks, respectively.

Using the above techniques, the system can train an LSTM classifier to process certain features to score individual frames as to whether or not they include whispered speech. The classifier may then be used by the speech quality detector 285 at runtime to determine if audio data corresponds to whispered speech.

The speech quality detector 285 may determine speech qualities other than whether speech was whispered. For example, based on parametric features, the speech quality detector 285 may determine whether the user was speaking in a scoffing or sarcastic tone, the user was sniffing or dismissive, the user was whining, the user sneezed or coughed, the user was talking under his/her breath with others present so only the device 110 will detect the speech, speech distance, etc.

The speech quality detector 285 may implement a single model that outputs a speech quality indicator, or may implement a plurality of models, each configured to determine, based on feature values input to the model, whether the speech corresponds to a particular quality. For example, one model may be configured to determine whether speech was whispered, another model may be configured to determine whether speech was whined, etc. Or, as noted, a single model may be configured to determine multiple speech quality indicators that may apply to speech based on that speech's qualities. The speech quality detector 285 may operate within the ASR component 250 (as illustrated) or as a separate component as part of server(s) 120.

One or more models used by the speech quality detector 285 may be trained specific to a user. For example, a user may have a health problem that causes them to speak in a manner that, if not trained specific to a user, would cause a model(s) to determine the user was whispering. Thus, the speech quality detector 285 may receive a user ID output by the user recognition component 295, determine one or more trained models associated with the user ID, and perform speech quality detection using those trained models.

The speech quality detector 285 may also consider non-audio data and non-audio features when determining a quality of speech. For example, if a camera detects the user 5, the speech quality detector 285 may analyze video data (received from the camera) to determine some quality of the user (e.g., agitated, subdued, angry, etc.). Other non-audio data may also be input to the speech quality detector 285. For example, time/date data, location data (e.g., GPS location or relative indoor room location of the device 110), ambient light data from a light sensor, the identity of nearby individuals to the user, proximity of the user to the device 110, etc. In a particular example, if user speech is received after a particular time of day (e.g., after a time of day when a user may go to sleep), the system may determine the speech corresponds to a whisper speech quality even if the speech was not whispered. The time of data a user may be considered to go to sleep may be specific to a user. In another particular example, if user speech is received from a particular location after a particular time of day (e.g., from a user device in a bedroom after a particular time of day), the system may determine the speech corresponds to a whisper speech quality even if the speech was not whispered. Thus, the speech quality detector 285 may consider user profile data. The types of acoustic and non-audio data considered by the speech quality detector 285 in determining one or more qualities of specific speech depends on the types of such data available to the system.

The speech quality detector 285 may consider image data to determine a gesture of a user. The speech quality detector 285 may consider the gesture in determining a speech quality of the user input. The gesture may corresponding to a facial gesture. The gesture may also correspond to a gesture performed by body parts other than the face of the user (e.g., motion of one or more arms of the user).

The speech quality detector 285 may consider various data representing an environment of the user.

The model(s) available to the speech quality detector 285 may be trained on the various data types available to the speech quality detector 285. For example, a first model may be trained to detect that speech is whispered whereas a second model may be trained to determine that ambient light data from a light sensor is below a certain threshold. The output from the second model (or more simply, an output from a component such as the light sensor) may indicate to the first model that the atmosphere is dark, which may be used to increase a confidence of the first model that the speech was whispered. Thus, one model's output may impact another model's output. The outputs of all models may be collectively used by the speech quality detector 285 to determine one or more speech qualities of the speech.

Various machine learning techniques may be used to train and/or operate the machine learning models usable by the speech quality detector 285. In machine learning techniques, component is "trained" by repeatedly providing it examples of data and how the data should be processed using an adaptive model until it can consistently identify how a new example of the data should be processed, even if the new example is different from the examples included in the training set. Getting an adaptive model to consistently identify a pattern is in part dependent upon providing the component with training data that represents the desired decision features in such a way that patterns emerge. Providing data with consistent patterns and recognizing such patterns when presented with new and different data is within the capacity of today's systems.

For example, as above, a component (e.g., the speech quality detector 285) may be trained using example audio data segments and different values for the various paralinguistic data features available to the system. Different models may be trained to recognize different speech qualities or a single model may be trained to identify applicable speech qualities associated with particular speech. For example, a single model may be trained to analyze both audio and non-audio data to determine a speech quality. Alternatively, a certain model(s) may be trained to analyze audio data and a separate model(s) may be trained to analyze non-audio data.

Example machine learning techniques include neural networks, inference engines, trained classifiers, etc. Examples of trained classifiers include support vector machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so the examples of the separate categories are divided by clear gaps. New examples are then mapped into that same space and predicted to belong to a category based on which side of the gaps they fall on. Classifiers, either binary or multiple category classifiers, may issue a "score" indicating which category the data most closely matches. The score may provide an indicator of how closely the data matches the category. For example, in the present disclosure, a SVM may be trained to process audio data, for example audio feature vectors, to determine if speech was whispered. Among the factors the SVM may consider is whether the speech has a resonance below a resonance threshold and/or a volume below a volume threshold. Other features of the speech may also be considered when the SVM classifies the speech as whispered or not whispered.

Training a model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the models used by the speech quality detector 285.

For example, a model, such as a SVM classifier, may be trained to recognize when speech is whispered using many different training utterances, each labeled either "whispered" or "not whispered." Each training utterance may also be associated with various feature data corresponding to the respective utterance, where the feature data indicates values for the acoustic and/or non-audio paralinguistic features that may be used to determine if further speech is whispered. The model may be constructed based on the training utterances and then disseminated to the speech quality detector 285, which uses the model(s) to make decisions at runtime as to whether speech was whispered. Similar training may take place for different speech qualities (e.g., excitement, boredom, etc.) where different models are trained or a single model is trained.

The ASR component 250 may send ASR results data (e.g., text data representing an N-best list of hypotheses) and a speech quality indicator to the orchestrator component 230. The orchestrator component 230 persists the speech quality indicator in a storage. The orchestrator component 230 associates the speech quality indicator with a session identifier (ID) in the storage. A session ID may be used by various components of the system to keep track of what processing data relates to each other. The orchestrator component 230 may send the ASR results data (and optionally the speech quality indicator) to an NLU component 260.

The NLU component 260 attempts to make a semantic interpretation of the phrases represented in the text data input therein. That is, the NLU component 260 determines one or more meanings associated with the phrases represented in the text data based on words represented in the text data. The NLU component 260 determines an intent representing an action that a user desires be performed as well as pieces of the text data that allow a device (e.g., the device 110, the server(s) 120, a speechlet component(s) 290, the speechlet server(s) 125, etc.) to execute the intent. For example, if the text data corresponds to "play Adele music," the NLU component 260 may determine an intent that the system output Adele music and may identify "Adele" as an artist. For further example, if the text data corresponds to "what is the weather," the NLU component 260 may determine an intent that the system output weather information associated with a geographic location of the device 110. For yet further example, if the text data corresponds to "book me a ride to the Seattle airport," the NLU component 260 may determine an intent that the system book a ride sharing service trip to the Seattle airport. The NLU component 260 may send NLU results data (e.g., tagged text data, indicators of intent, etc.) to the orchestrator component 230.

The orchestrator component 230 determines a speechlet component 290 best configured to execute the intent of the user. The NLU results data may include an N-best list of hypotheses, with each hypothesis including an indicator of an intent, tagged text data, and a confidence value representing the NLU component's confidence in the hypothesis representing the user's intent. The orchestrator 230 may determine a speechlet component 290 configured to execute with respect to the indicator of the intent associated with the greatest confidence value in the NLU results data.

The orchestrator component 230 may send, to the speechlet component 290, the intent indicator and tagged text data that is output by the NLU component 260 and that is associated with the speechlet component 290. A speechlet component 290 may determine audio data and/or text data that is responsive to user speech.

A speechlet component may operate one or more speechlets. A "speechlet" may be software running on the server(s) 120 that is akin to a software application running on a traditional computing device. A speechlet may enable the server(s) 120 to execute specific functionality in order to provide data or produce some other requested output. The server(s) 120 may be configured with more than one speechlet. For example, a weather service speechlet may provide weather information, a car service speechlet may book a trip with respect to a taxi or ride sharing service, an order pizza speechlet may order a pizza with respect to a restaurant's online ordering system, a communications speechlet may perform messaging or multi-endpoint communications, a Q&A speechlet may provide various Q&A information, etc. A speechlet component 290 may operate in conjunction between the server(s) 120 and other devices such as a device 110 in order to complete certain functions. Inputs to a speechlet component 290 may come from speech processing interactions or through other interactions or input sources.

A speechlet component 290 may include hardware, software, firmware, or the like that may be dedicated to a particular speechlet component 290 or shared among different speechlet components 290. A speechlet component 290 may be part of the server(s) 120 (as illustrated in FIG. 2) or may be located at whole or in part with a speechlet server(s) 125.

A speechlet component 290 may, in certain instances, send the intent indicator and tagged text data to a speechlet server(s) 125 so the speechlet server(s) 125 may execute a skill. A "skill" may enable the speechlet server(s) 125, and by extension the server(s) 120, to execute specific functionality in order to provide data or produce some other requested output. For example, a weather service skill may provide weather information, a car service skill may book a trip with respect to a taxi or ride sharing service, an order pizza skill may order a pizza with respect to a restaurant's online ordering system, etc. A particular speechlet server 125 may be configured to execute more than one skill.

The system may be configured with various types of speechlets and skills. Types of speechlets/skills include home automation speechlets/skills (e.g., speechlets/skills that enable users to control home devices such as lights, door locks, cameras, thermostats, etc.), entertainment device speechlets/skills (e.g., speechlets/skills that enable users to control entertainment devices such as smart TVs), video speechlets/skills, flash briefing speechlets/skills, as well as custom speechlets/skills that are not associated with any pre-configured type of speechlet.

In certain instances, a speechlet component 290 or speechlet server 125 may output data in a form most suitable for output to a user. In other instances, a speechlet component 290 or speechlet server 125 may output data in a form that is not most suitable for output to a user. Such an instance includes a speechlet component 290 or speechlet server(s) 125 providing text data while audio data is most suitable for output to a user.

The server(s) 120 may include a TTS component 280 that generates audio data from text data using one or more different methods. The audio data generated by the TTS component 280 may then be output by a device 110 as synthesized speech. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may additionally include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, one skilled in the art will appreciate that the user profile storage 270 may be in communication with the server(s) 120, for example over the network(s) 199.

The server(s) 120 may include a user recognition component 295. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data (e.g., including representations of features of users). The user recognition component 295 may perform additional user recognition processes, including those known in the art. Output of the user recognition component 295 may include a single user ID corresponding to the most likely user that originated the current input. Alternatively, output of the user recognition component 295 may include an N-best list of user IDs with respective scores indicating likelihoods of respective users originating the current input. The output of the user recognition component 295 may be used to inform NLU component 260 processing, Q&A service 265 processing, as well as processing performed by speechlet components 290.

FIGS. 3A through 3D illustrate system processing when a speechlet component 290 may output audio data responsive to speech having a particular speech quality. As described above, the speech quality detector 285 processes audio data including speech using one or more trained models to determine a speech quality indicator representing the speech. The speech quality indicator may represent the speech was whispered, shouted, etc. The orchestrator component 230 receives (302) the speech quality indicator from the speech quality detector 285.

The orchestrator component 230 may determine whether the speech quality, represented by the speech quality indicator, is enabled for the user that spoke the speech. The orchestrator component 230 may receive a user ID, for example from the user recognition component 295, that represents a user that most likely spoke the speech. The orchestrator component 230 may determine user profile data, in the user profile storage 270, associated with the user ID. The orchestrator component 230 may then determine (304) the user profile data represents the speech quality of the present speech is enabled for the user (e.g., the user has enabled the system to perform various processes based on speech having the particular speech quality).

The orchestrator component 230 may send (306) a request for current configurations to the device 110 from which the audio data representing the speech was received. Thereafter, the orchestrator component 230 may receive (308) text data representing the device's current configurations. Example current configurations include a current output volume level of the device 110, a current brightness of the device's display, and the like.

When a user provided input (e.g., speech) to the system, the system may create a session ID. The system may use the session ID to keep track of processing that is related. For example, when a user speaks an input to the system, the system may perform ASR processing on audio data representing the speech to generate text data, may perform speech quality processing on the audio data to determine a speech quality, may perform NLU processing on the ASR-generated text data to determine an intent of the user, etc. The ASR processing, speech quality processing, NLU processing, and other processing performed with respect to a single user input may be associated by a single session ID.

The orchestrator component 230 may determine (310) a session ID associated with the present speech. Thereafter, the orchestrator component 230 may associate (312) the speech quality indicator and the text data representing the device's current configurations with the session ID in storage.

The orchestrator component 230 receives (314) NLU results data from the NLU component 260. The NLU results data may include an N-best list, with each item in the list including an intent indicator, tagged text data, and a confidence score. Alternatively, the NLU results data may simply include the top scoring intent indicator and associated tagged text data.

The orchestrator component 230 determines (316) a speechlet component 290 configured to execute with respect to the NLU results data. If the NLU results data includes an N-best list, the orchestrator component 230 may determine a speechlet component 290 configured to execute with respect to the top scoring item.

The orchestrator component 230 sends the NLU results data (or a portion of an N-best list of the NLU results data associated with the speechlet component 290) (318), the speech quality indicator (320), and the session ID (322) to the determined speechlet component 290. The speechlet component 290 may determine (324) audio data responsive to the received NLU results data. The speechlet component 290 may thereafter send an audio data identifier (326) and the session ID (328) to the orchestrator component 230. The audio data identifier may be a uniform resource locator ("URL").

The system may be configured with speechlet components that ignore indications of speech quality. Thus, the orchestrator component 230 may perform a check to ensure the data received from the speechlet component 290 conforms to the speech quality indicator.

The orchestrator component 230 determines (330) the speech quality indicator associated with the session ID received from the speechlet component 290. The orchestrator component 230 determines (332), based on the speech quality indicator, the audio data is to be output at a particular volume level (e.g., low, medium, high, a decibel range, etc.) The orchestrator component 230 also determines (334) the speechlet component 290 ignored the speech quality indicator (e.g., determines the data received from the speechlet component 290 does not indicate the audio data is to be output at the particular volume level).

The orchestrator component 230 may generate (336) metadata representing the audio data is to be output at the volume corresponding to the speech quality indicator. For example, the metadata may represent the audio data is to be output at a binned volume, such as high, medium, low, or the like. For further example, the metadata may represent the audio data is to be output at a particular decibel range. The orchestrator component sends (338) the metadata to the device 110 (or another user device represented in user profile data associated with the user Id associated with the present session ID).

The orchestrator component 230 sends the audio data identifier (340) to the device 110 (or other user device). The device 110 (or other user device) uses the audio data identifier to receive audio data from the speechlet component 290. The device 110 (or other user device) outputs (342) audio, corresponding to the audio data, at the volume level represented in the metadata. The device 110 may set its volume level according to the metadata once the device 110 receives the metadata. If the device does so, the device may simply output the audio upon receive the audio data rather than receiving the audio data and then having to configure its volume setting prior to outputting the audio.

If the present configurations of the device 110 indicate audio is present configured to be output at the volume associated with the speech quality indicator, the metadata generated by the orchestrator component 230 may simply indicate the device 110 is to output the audio data at the present volume configuration.

In some situations, a speechlet component 290 may provide the orchestrator component 230 with a signal that prevents the orchestrator component 230 from performing the foregoing check and that causes content to be output to the user based on the speechlet component's preference. For example a user may whisper "Alexa, play happy birthday." The speechlet component 290 may receive NLU results data representing the user wants the song happy birthday to be played. The speechlet component 290 may also receive a speech quality indicator representing the user's speech was whispered. Given that the requested song is "happy birthday," the speechlet component 290 may want the song to be output at at least a normal volume level, rather than a low volume level as indicated by the whispered speech. Thus, the speechlet component 290 may send, to the orchestrator component 230, data representing the audio data is to be output at at least the normal volume level. This data may prevent the orchestrator component 230 from performing steps 332 through 340 and may, instead, simply cause the orchestrator component 230 to send the audio data to the device 110 (or another device) along with a directive to output the audio data at at least the normal volume level.

A speechlet component 290 may also or alternatively determine text data that is responsive to user speech. FIGS. 4A through 4C illustrate system processing when a speechlet component 290 may output text data responsive to speech having a particular speech quality. The orchestrator component 230 and the speechlet component 290 may perform some or all of steps 302 through 322 described above.

The speechlet component 290 may determine (402) text data responsive to the NLU results data the speechlet component 290 received from the orchestrator component 230. The speechlet component 290 may thereafter send the text data (404) and the session ID (328) to the orchestrator component 230.

The orchestrator component 230 determines (330) the speech quality indicator associated with the session ID received from the speechlet component 290. The orchestrator component 230 may determine (406) that, based on the speech quality indicator, the text data is to be processed using non-default TTS configurations to generate synthesized speech having a non-default quality. The non-default quality may be an in-kind quality to the speech quality output by the speech quality detector 285. For example, the speech quality indicator may represent speech was whispered. In response, the orchestrator component 230 may determine the TTS generated audio data should include whispered synthesized speech. For further example, the speech quality indicator may represent speech was shouted. In response, the orchestrator component 230 may determine the TTS generated audio data should include shouted synthesized speech. Alternatively, the non-default quality may not be an in-kind quality to the speech quality output by the speech quality detector 285. The non-default quality should correspond to how a human would respond to the user, which may not be in-kind to the user' speech quality. The non-default quality may correspond to a change in emotion rather than a change in quality (e.g., whisper, shout, etc.). For example, in response to a particular user speech quality, it may be customary for a human in one culture to respond in a conciliatory manner while it may be customary in another culture for a human to respond in a more direct manner.

The orchestrator component 230 may determine (334) the speechlet component 290 ignored the speech quality indicator (e.g., determines the data received from the speechlet component 290 does not indicate TTS is to be configured to generate synthesized speech having a non-default quality. The orchestrator component 230 may generate (408) metadata representing TTS processing is to be performed to generate synthesized speech having a non-default quality. For example, the metadata may represent the synthesized speech is to include a whisper quality. For further example, the metadata may represent the synthesized speech is to include a shout quality.

The orchestrator component 230 sends the text data (410) and the metadata (412) to the TTS component 280. The TTS component 280 performs (414) TTS processing using non-default configurations to generate audio data including synthesized speech having the non-default quality represented in the metadata.

The orchestrator component 230 receives the audio data (416) from the TTS component 280. The orchestrator component 230 may thereafter cause (420) the device 110 from which the original user speech was received (or another user device represented in user profile data associated with the user ID associated with the present session ID) to output audio corresponding to the audio data.

In some situations, a speechlet component 290 may provide the orchestrator component 230 with a signal that prevents the orchestrator component 230 from performing the foregoing check and that causes content to be output to the user based on the speechlet component's preference. For example a user may say in normal tone "Alexa, what is my bank account balance." The speechlet component 290 may receive NLU results data representing the user wants their bank account balance output. The speechlet component 290 may also receive a speech quality indicator representing the user's speech was spoken "normally." Given that the requested information is highly confidential, the speechlet component 290 may want the information to be output as whispered synthesized speech, rather than synthesized speech having "normal" qualities. Thus, the speechlet component 290 may send, to the orchestrator component 230, data representing the text data is to be converted to whispered synthesized speech. This data may prevent the orchestrator component 230 from performing steps 332 through 412 and may, instead, cause the orchestrator component 230 to send, to the TTS component 280, the text data and metadata representing the resulting audio data is to include whispered synthesized speech.

As described, the speech quality indicator may be used to cause content output to a user to exhibit qualities of the user's speech, such as whispering or shouting. Other qualities may also be used. For example, if the user speech has a tempo that deviates from the user's typical speech (which may be determined by comparing a tempo of the current speech to a tempo represented in the user's profile data), the system may output content having a non-default tempo. For example, if the user speech is faster than normal, the system may output content to the user faster than normal. Likewise, if the user speech is slower than normal, the system may output content to the user slower than normal.

The system may be configured to receive user input at one user device and cause content to be output at a second user device. For example, the system may be configured with a communications speechlet component that is configured to send messages, spoken at one user device, to a recipient user device. A user originating a spoken message may whisper the message, for example if other individuals are near the user and the user does not want the other individuals to hear the content of the message. However, it may be undesired, from a recipient perspective, to receive a whispered or otherwise low volume message based on the message originating as whispered speech. In situations such as this, the system may be configured to ignore a speech quality indicator and cause the message to be output to a recipient as if the message was spoken "normally."

As illustrated and described with respect to FIGS. 3A through 4C, the orchestrator component 230 may perform various operations to ensure the system responds to a user in a contextually appropriate manner. Some systems may be configured with a component, separate from but in communication with the orchestrator component 230, that performs some or all of the operations of the orchestrator component 230 illustrated in and described with respect to FIGS. 3A through 4C.

As described above, components of the system may use a session ID to maintain relationships between system processing and the appropriate user input, since the system may receive various user inputs at any given moment. One skilled in the art will appreciate that an identifier other than a session ID may be used, such as a user ID, customer ID, or some other identifier.

Figure 5:
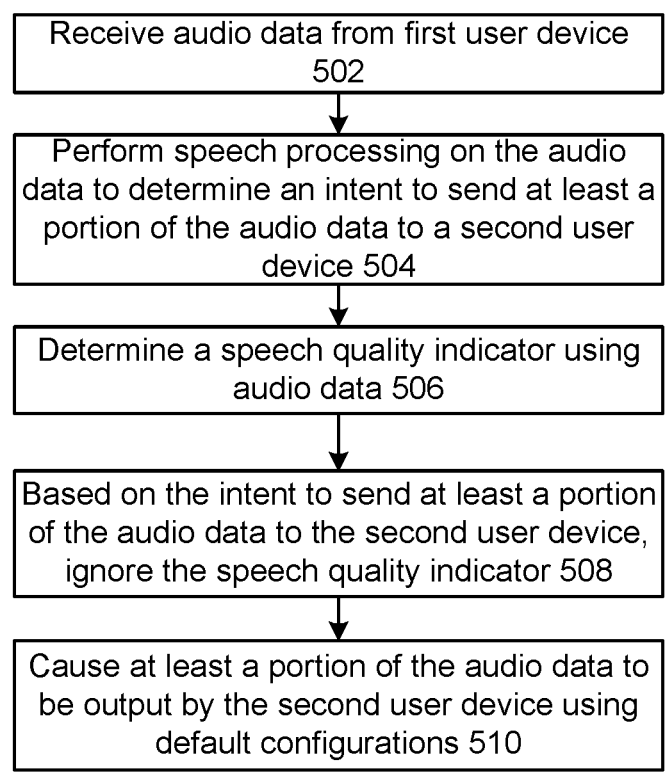
FIG. 5 is a process flow diagram illustrating that a speech quality indicator may be ignored depending on the user device that is to output content according to embodiments of the present disclosure.

FIG. 5 illustrates how a system may ignore a speech quality indicator when content is to be output by a user device different from the user device that received the user spoken input. The server(s) 120 may receive (502) audio data, corresponding at least in part to user speech, from a first user device. The server(s) 120 may perform (504) speech processing (e.g., ASR processing and NLU processing) to determine an intent of the user is to send at least a portion of the audio data to a second user device (e.g., an intent of the user is to send message content to a second user). The speech quality detector 285 may determine (506) a speech quality indicator representing the speech has at least one quality. Based on the foregoing intent, the orchestrator component 230 may determine (508) to ignore the speech quality indicator and cause (510) the at least a portion of the audio data (e.g., the message content) to be output by the second user device using default configurations (e.g., default volume level, synthesized speech having a default quality, etc.)

Nonetheless, there may be instances where the speaking user wants the content output to the recipient user to have a quality corresponding to the quality of the user's speech. The system may be configured to not ignore the speech quality indicator, even when content is to be output by a second user device, if the user explicitly indicates such. For example, if the user says "Alexa, whisper to John that I am going to be late to our meeting," the user's indication of "whisper to" in conjunction with the speech being whispered may cause the system to output whispered content to John.

A single session ID may be associated with a dialog between a single user and the system. A dialog may corresponding to various instances of user input and corresponding system output. One instance of user input and corresponding system output may correspond to one speech quality (e.g., whisper) while another instance of user input and corresponding system output may correspond to another speech quality (e.g., shout). Thus, a single session ID may include instances of different speech qualities and a speech quality of a particular output may be directly tied to only the speech quality of the corresponding input. Thus, if a user whispers a first input, the system outputs responsive whispered output, and the user thereafter shouts an input, the system may output responsive shouted output rather than responsive whispered output.

As described above, the orchestrator component 230 may send a speech quality indicator to the speechlet component 290 configured to execute the present user intent. The orchestrator component 230 may determine other speechlet components present executing with respect to the session ID. For example, a user may speak "play Adele" in normal tone, resulting in Adele music being output at a normal volume. While the Adele music is being output, the user may whisper an input to a user device. In this example, a music speechlet would be a presently executing speechlet. The orchestrator component 230 may send the speech quality indicator to the speechlet component configured to execute the whispered input and the presently executing speechlet component. This enables the presently executing speechlet component to reconfigure its present processing. According to the above example, the orchestrator component 230 may send the speech quality indicator to the music speechlet component and the music speechlet component may thereafter cause the music, which was being output at a normal volume, to be output at a lower volume. This would allow the user to better hear whispered content output by the system in response to the whispered input without needing to stop the music from being streamed.

Figure 6:
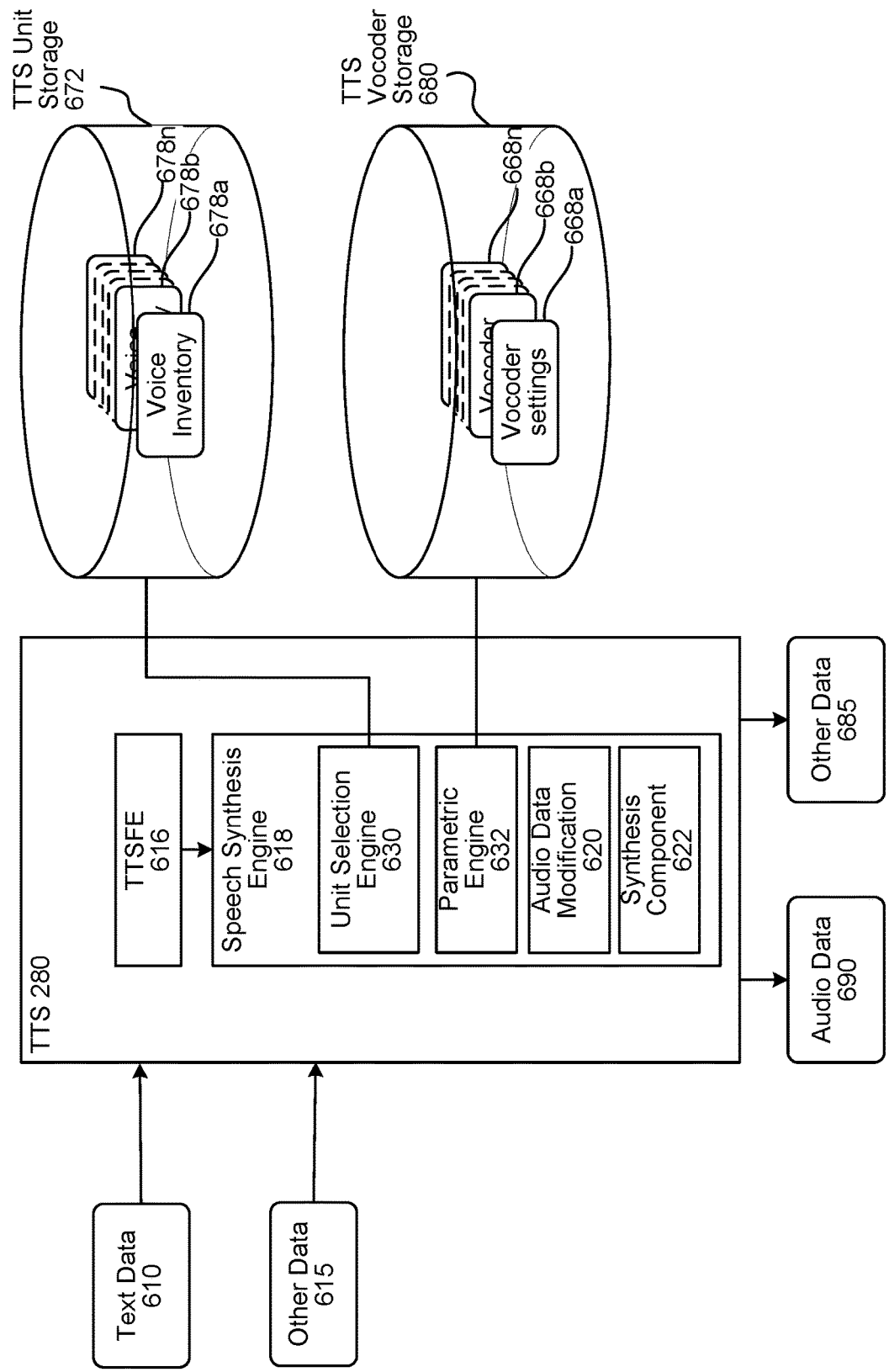
FIG. 6 illustrates components for performing TTS processing according to embodiments of the present disclosure.

As described, the TTS component 280 may use non-default configurations to generate synthesized speech having a non-default quality based on a speech quality indicator. FIG. 6 illustrates how the TTS component 280 may perform such processing. The TTS component 280 may include a TTS front end (TTSFE) 616 and a speech synthesis engine 618, and may be in communication with TTS unit storage 672 and TTS vocoder storage 680.

The TTS unit storage 672 may include, among other things, voice inventories 678a-688n that may include prerecorded audio segments (called units) to be used by a unit selection engine 630 when performing unit selection synthesis. The TTS vocoder storage 680 may include, among other things, vocoder settings 668a-668n that may be used by a parametric synthesis engine 632 when performing parametric synthesis. A particular set of vocoder settings 668 may correspond to a particular voice profile (e.g., whispered speech, excited speech, etc.). The parametric synthesis engine 632 may operate to synthesize speech using a traditional vocoder or to synthesize speech using neural network or machine learning-trained components.

The TTSFE 616 transforms text data 610 into a symbolic linguistic representation for processing by the speech synthesis engine 618. The TTSFE 616 may also process other data 615 that indicate how specific words should be pronounced, for example by indicating the desired output speech quality in tags formatted according to speech synthesis markup language (SSML) or in some other form. For example, a first tag may be included with text marking the beginning of when text should be whispered (e.g., <begin whisper>) and a second tag may be included with text marking the end of when text should be whispered (e.g., <end whisper>). The tags may be included in the text data 610 and/or the text for a TTS request may be accompanied by separate metadata indicating what text should be whispered (or have some other indicated audio characteristic). The speech synthesis engine 618 compares the annotated phonetic units, and optionally other information, stored in the TTS unit storage 672 and/or TTS vocoder storage 680 for converting the text data into audio data 690 corresponding to synthesized speech. The TTSFE 616 and the speech synthesis engine 618 may include their own controller(s)/processor(s) and memory or they may use the controller(s)/processor(s) and memory of the server(s) 120, the device 110, or other device, for example. Similarly, the instructions for operating the TTSFE 616 and the speech synthesis engine 618 may be located within the TTS component 695, within the memory and/or storage of the server(s) 120, the device 110, or within an external device.

Text data 610 input into the TTS component 280 may be sent to the TTSFE 616 for processing. The TTSFE 616 may include components for performing text normalization, linguistic analysis, and linguistic prosody generation. During text normalization, the TTSFE 616 processes the text data 610 and generates standard text, converting such things as numbers, abbreviations (such as Apt., St., etc.), symbols ($, %, etc.) into the equivalent of written out words.

During linguistic analysis the TTSFE 616 analyzes the language in the normalized text to generate a sequence of phonetic units corresponding to the text data 610. This process may be referred to as grapheme to phoneme conversion. Phonetic units include symbolic representations of sound units to be eventually combined and output by the system as speech. Various sound units may be used for dividing text for purposes of speech synthesis. The TTS component 280 may process text based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system. The linguistic analysis performed by the TTSFE 616 may also identify different grammatical components such as prefixes, suffixes, phrases, punctuation, syntactic boundaries, or the like. Such grammatical components may be used by the TTS component 280 to craft a natural sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis, the TTSFE 616 may perform linguistic prosody generation where the phonetic units are annotated with desired prosodic characteristics, also called acoustic features, which indicate how the desired phonetic units are to be pronounced in the eventual output speech. During this stage the TTSFE 616 may consider and incorporate any prosodic annotations (for example as other data 615) that accompanied the text data 610. Such acoustic features may include pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of user spoken speech (for example, the phonetic units may indicate prosodic characteristics to make the ultimately synthesized speech sound like a whisper based on the input speech being whispered).

The output of the TTSFE 616, referred to as a symbolic linguistic representation, may include a sequence of phonetic units annotated with prosodic characteristics. This symbolic linguistic representation may be sent to the speech synthesis engine 618, also known as a synthesizer, for conversion into an audio waveform. The speech synthesis engine 618 may be configured to convert the text data output by the TTSFE 616 into high-quality natural-sounding speech in an efficient manner. Such high-quality speech may be configured to sound as much like a human speaker as possible, or may be configured to be understandable to a listener without attempts to mimic a precise human voice.

The speech synthesis engine 618 may perform speech synthesis using one or more different methods. In one method of synthesis called unit selection, a unit selection engine 630 matches the symbolic linguistic representation created by the TTSFE 616 against a database of recorded speech, such as a database (e.g., TTS unit storage 672) storing information regarding one or more voice corpuses (e.g., voice inventories 678a-678n). Each voice inventory 678 may correspond to various segments of audio that were recorded by a speaking human, such as a voice actor, where the segments are stored in an individual inventory 678 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 630 may then use the information about each unit to select units to be joined together to form the speech output.

The unit selection engine 630 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 622) to form audio data 690 representing synthesized speech. Using all the information in the unit database, the unit selection engine 630 may match units to the text output by the TTSFE 616 to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis, parameters such as frequency, volume, noise, are varied by the parametric synthesis engine 632, digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 622) can generate audio waveforms having the desired acoustic properties. Parametric synthesis may include the ability to be accurate at high processing speeds, as well as the ability to process speech without the large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 295 may include specially configured data, instructions and/or components to synthesize speech in the desired language(s). To improve performance, the TTS component 280 may revise/update the contents of the TTS storage based on feedback of the results of TTS processing.

The TTS unit storage 672 may be customized for an individual user based on their individualized speech. In particular, the speech units stored in a unit database may be taken from audio data spoken by a user. For example, the system may be configured with multiple voice inventories 678a-678n, where each voice inventory 678 is configured with a different "voice" to match desired speech qualities. Such voice inventories may also be linked to user accounts. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses. For example the individual may whisper the training utterances, say them in an excited voice, and so on. Thus, the audio of each customized voice corpus may match the respective desired speech quality. The customized voice inventory 278 may then be used during runtime to perform unit selection to synthesize speech having a desired speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., vocoder settings 668) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

As an alternative to customized voice corpuses or customized parametric "voices," one or more filters may be used to alter traditional TTS output to match the desired one or more speech qualities. For example, the TTS component 280 may synthesize speech as normal, but the system (either as part of the TTS component 680 or otherwise) may apply a filter to make the synthesized speech take on the desired speech quality. In this manner, a traditional TTS output may be altered to take on the desired speech quality. The filtering may be performed by an audio data modification component 620 to create whispered speech as described above, or to create other audio voice effects.

Parametric speech synthesis may be performed as follows. The TTS component 280 may include an acoustic model, or other models, which may convert a symbolic linguistic representation into a synthetic acoustic waveform of the text input based on audio signal manipulation. The acoustic model includes rules which may be used by the parametric synthesis engine 632 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 616.

The parametric synthesis engine 632 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 618, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First, the unit selection engine 630 determines what speech units to use and then it combines them so that the particular combined units match the desired phonemes and acoustic features. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 630. As part of unit selection, the unit selection engine 630 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 672 or in another storage component. For example, different unit selection databases may be stored in TTS unit storage 672. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation, the speech synthesis engine 618 may attempt to select a unit in the speech unit database that most closely matches the input text (including both phonetic units and prosodic annotations). Generally the larger the voice corpus/ speech unit database the better the speech synthesis may be achieved by virtue of the greater number of unit samples that may be selected to form the precise desired speech output.

After a unit is selected by the unit selection engine 630, the audio data corresponding to the unit may be passed to the audio data modification component 620. The audio data modification component 620 may then process the audio data of the unit to create modified audio data where the modified audio data reflects a desired audio quality. The audio data modification component 620 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 280. For each unit that corresponds to the selected portion, the audio data modification component 620 may process the audio data for that unit to create a modified unit audio data. The modified unit audio data may then be concatenated to form the audio data 690. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 280. In that case, other data 685 may be output along with the audio data 690 so an ultimate playback device (e.g., the device 110) receives instructions for playback that can assist in creating the desired output audio. Thus, the other data 685 may include instructions or other data indicating playback device settings (such as volume, playback rate, etc.) or other data indicating how the audio data 690 should be output. For example, for whispered speech, the audio data 690 may be associated with other data 685 that may include a prosody tag or other indicator that instructs the device 110 to slow down playback of the audio data 690, thus making the ultimate audio sound more like whispered speech, which is typically slower than normal speech. In another example, the other data 685 may include a volume tag that instructs the device 110 to output the speech at a volume level less than a current volume setting of the device 110, thus improving the quiet whisper effect.

Figure 7:
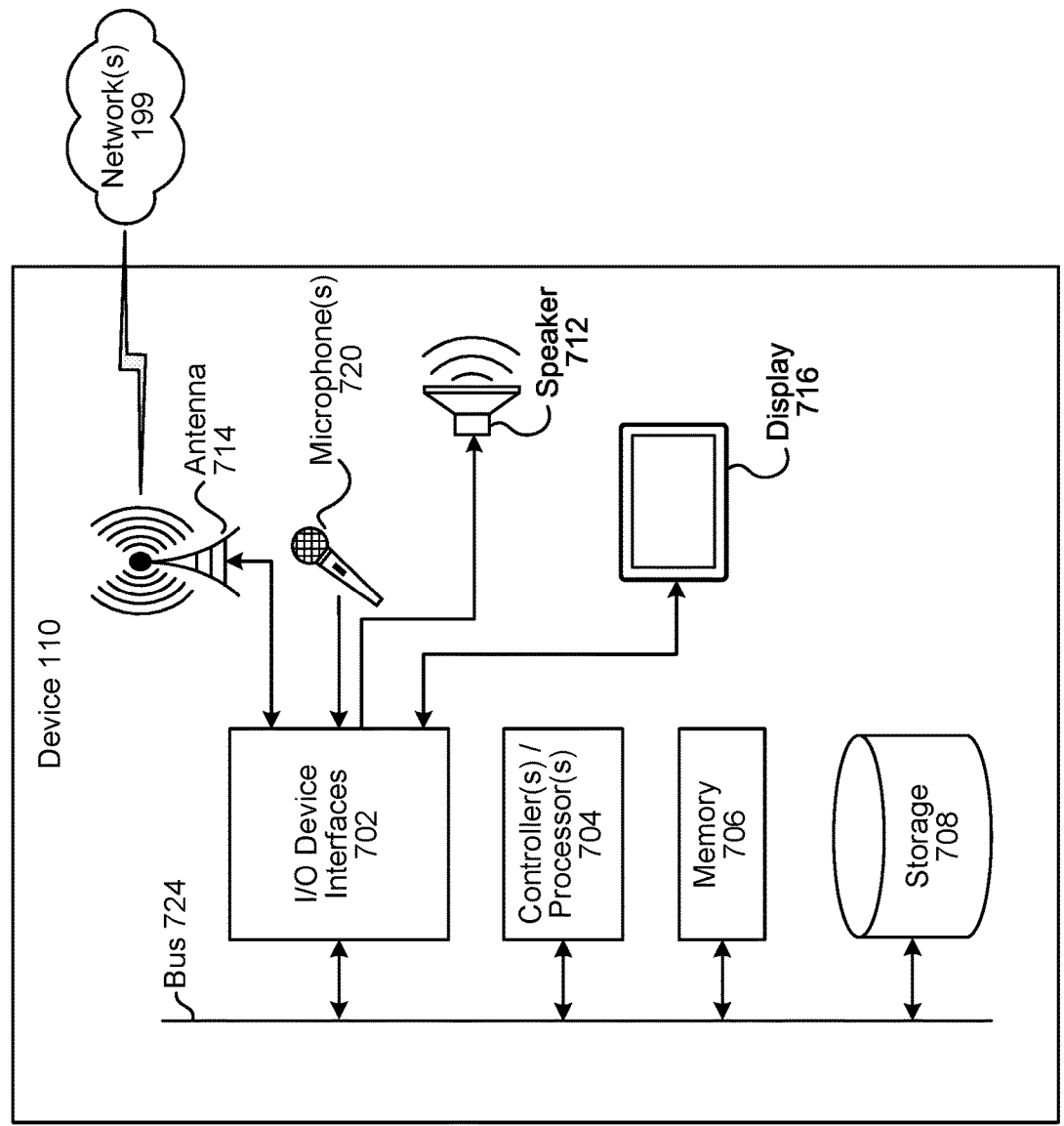
FIG. 7 is a block diagram conceptually illustrating example components of a device according to embodiments of the present disclosure.
Figure 8:
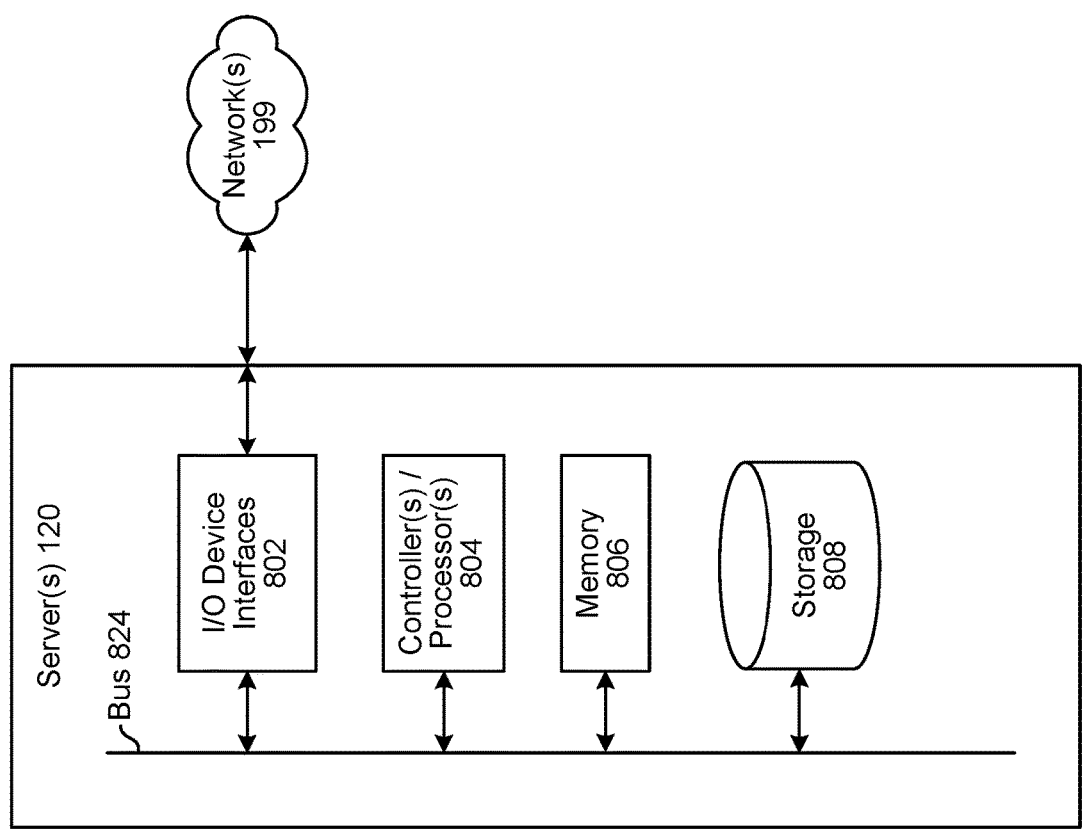
FIG. 8 is a block diagram conceptually illustrating example components of a server according to embodiments of the present disclosure.

FIG. 7 is a block diagram conceptually illustrating a device 110 that may be used with the system. FIG. 8 is a block diagram conceptually illustrating example components of a remote device, such as the server(s) 120, which may assist with ASR processing, NLU processing, etc. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (702/802), processor(s) (704/804), memory (706/806), and/or storage (708/808) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 9:
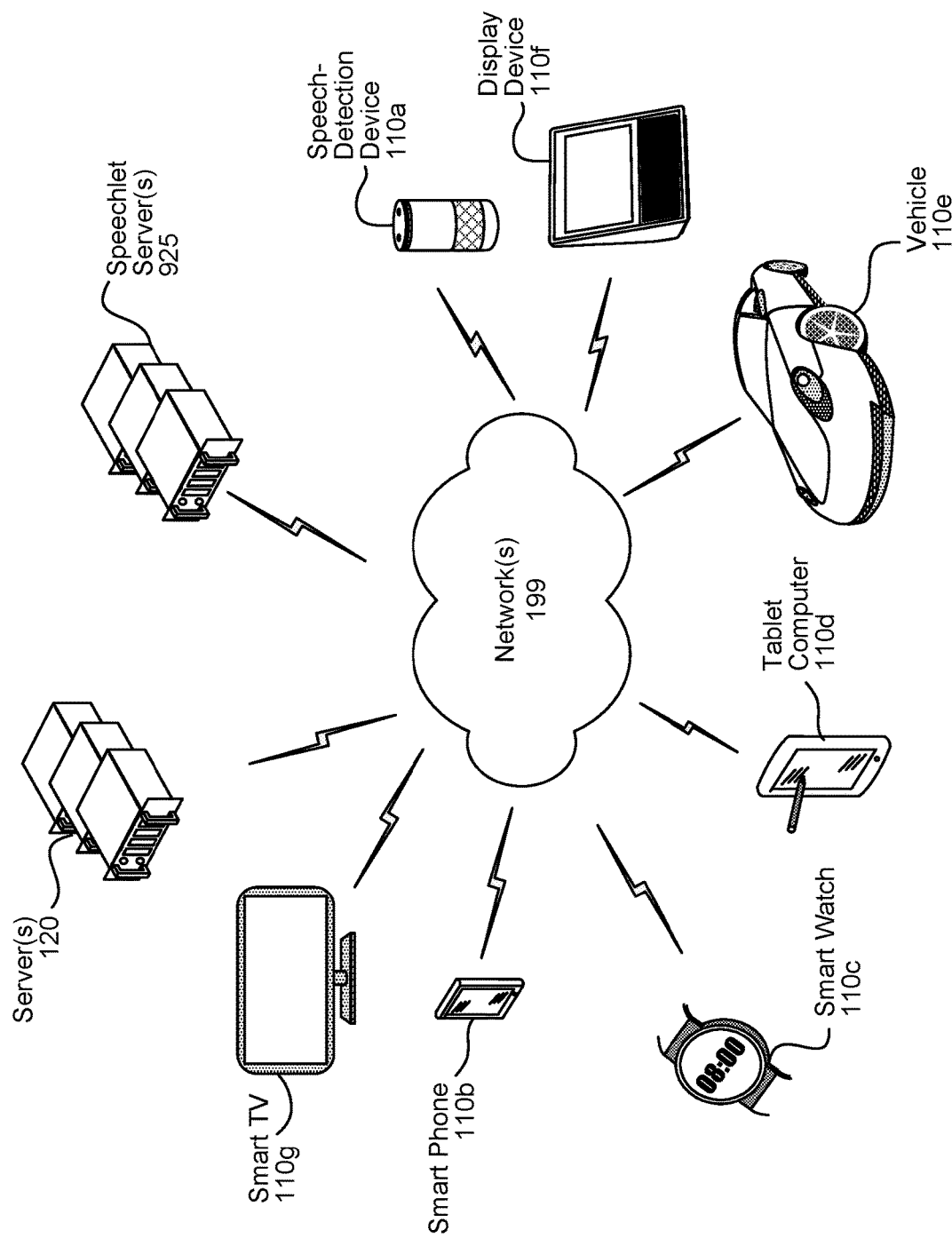
FIG. 9 illustrates an example of a computer network for use with a speech processing system.

As illustrated in FIG. 9, multiple devices (110a-110g, 120, 925) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server(s) 925, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving, from a first device, first audio data representing first speech;
   determining a user identifier associated with the first audio data;
   determining a trained model associated with the user identifier, the trained model configured to determine an emotion corresponding to speech associated with the user identifier;
   processing, using the trained model, the first audio data to determine a first indicator representing a first emotion corresponding to the first speech;
   performing speech processing on the first audio data to generate natural language understanding (NLU) results data comprising at least an intent corresponding to the first speech;
   determining a first component configured to process the NLU results data;
   sending, to the first component, the NLU results data and the first indicator;
   determining, by the first component, first content responsive to the first speech;
   determining, by the first component, second content responsive to the first speech;
   determining, by the first component and based at least in part on the first indicator, that the first content is to be output instead of the second content;
   receiving the first content from the first component; and
   causing output of the first content.

2. The computer-implemented method of claim 1, further comprising:
   generating metadata representing text-to-speech (TTS) processing is to be performed based at least in part on the first emotion; and
   performing, based at least in part on the metadata, TTS processing on the first content to generate second audio data,
   wherein causing output of the first content comprises causing output of audio corresponding to the second audio data.

3. The computer-implemented method of claim 2, wherein the second audio data matches the first emotion.

4. The computer-implemented method of claim 1, further comprising:
   determining the first indicator based at least in part on processing image data corresponding to the first speech.

5. The computer-implemented method of claim 4, wherein the image data represents a gesture of a user.

6. The computer-implemented method of claim 4, wherein the image data represents a face of a user.

7. The computer-implemented method of claim 1, wherein the first content corresponds to second audio data and the computer-implemented method further comprises:
   generating, based at least in part on the first indicator, metadata representing the second audio data is to be output at a first volume level;
   sending the second audio data to the first device; and
   sending the metadata to the first device, the metadata causing the first device to output audio, corresponding to the second audio data, at the first volume level.

8. The computer-implemented method of claim 1, wherein causing output of the first content comprises causing a second device, different from the first device, to output the first content.

9. A system comprising:
   at least one processor; and
   at least one memory comprising instructions that, when executed by the at least one processor, cause the system to:
     receive, from a first device, first audio data representing first speech;
     determine a user identifier associated with the first audio data;
     determine a trained model associated with the user identifier, the trained model configured to determine a speech quality corresponding to speech associated with the user identifier;
     process, using the trained model, the first audio data to determine a first indicator representing a first speech quality corresponding to the first speech;
     perform speech processing on the first audio data to generate natural language understanding (NLU) results data comprising at least an intent corresponding to the first speech;
     determine a first component configured to process the NLU results data;
     send, to the first component, the NLU results data and the first indicator;
     determine, by the first component, first content responsive to the first speech;
     determine, by the first component, second content responsive to the first speech;
     determine, by the first component and based at least in part on the first indicator, that the first content is to be output instead of the second content;

receive the first content from the first component; and
cause output of the first content.

10. The system of claim 9, wherein the at least one memory further comprises instructions that, when executed by the at least one processor, further cause the system to:
generate metadata representing text-to-speech (TTS) processing is to be performed based at least in part on the first speech quality; and
perform, based at least in part on the metadata, TTS processing on the first content to generate second audio data,
wherein the instructions that cause output of the first content further cause the system to cause output of audio corresponding to the second audio data.

11. The system of claim 9, wherein the first speech quality corresponds to a first emotion corresponding to the first speech.

12. The system of claim 10, wherein the second audio data matches the first speech quality.

13. The system of claim 9, wherein the at least one memory further comprises instructions that, when executed by the at least one processor, further cause the system to:
determine the first indicator based at least in part on processing image data corresponding to the first speech.

14. The system of claim 13, wherein the image data represents a gesture of a user.

15. The system of claim 13, wherein the image data represents a face of a user.

16. The system of claim 9, wherein the first content corresponds to second audio data and the at least one memory further comprises instructions that, when executed by the at least one processor, further cause the system to:
generate, based at least in part on the first indicator, metadata representing the second audio data is to be output at a first volume level;
send the second audio data to the first device; and
send the metadata to the first device, the metadata causing the first device to output audio, corresponding to the second audio data, at the first volume level.

17. The system of claim 9, wherein the at least one memory further comprises instructions that, when executed by the at least one processor, further cause the system to:
cause a second device, different from the first device, to output the first content.

18. The computer-implemented method of claim 1, further comprising:
determining user profile data associated with the user identifier;
determining the user profile data indicates the first emotion is enabled to be used to perform processing related to the first audio data; and
after determining the user profile data indicates the first emotion is enabled to be used to perform processing related to the first audio data, causing the first content to be output.

19. The system of claim 9, wherein the at least one memory further comprises instructions that, when executed by the at least one processor, further cause the system to:
determine user profile data associated with the user identifier;
determine the user profile data indicates the first speech quality is enabled to be used to perform processing related to the first audio data; and
after determining the user profile data indicates the first speech quality is enabled to be used to perform processing related to the first audio data, cause the first content to be output.

20. The computer-implemented method of claim 1, wherein causing output of the first content comprises causing the first device to output the first content in a first manner corresponding to the first emotion and the computer-implemented method further comprises:
while causing output of the first content, receiving, from the first device, second audio data representing second speech;
processing, using the trained model, the second audio data to determine a second indicator representing a second emotion corresponding to the second speech; and
in response to the second indicator, causing the first device to output the first content in a second manner corresponding to the second emotion, the second manner being different from the first manner.

21. The computer-implemented method of claim 20, further comprising:
determining synthesized speech corresponding to a response to the second speech; and
causing the first device to output the synthesized speech while the first device is outputting the first content in the second manner.

22. The computer-implemented method of claim 21, wherein:
the synthesized speech is whispered synthesized speech; and
the second manner of outputting the first content involves outputting the first content at a lower volume than outputting the first content in the first manner.

\* \* \* \* \*